(12) United States Patent
Last

(10) Patent No.: US 9,506,750 B2
(45) Date of Patent: Nov. 29, 2016

(54) IMAGING RANGE FINDING DEVICE AND METHOD

(71) Applicant: Apple Inc., Cupertino, CA (US)

(72) Inventor: Matthew Emanuel Last, Davis, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/708,796

(22) Filed: Dec. 7, 2012

(65) Prior Publication Data

US 2014/0071431 A1    Mar. 13, 2014

Related U.S. Application Data

(60) Provisional application No. 61/698,375, filed on Sep. 7, 2012.

(51) Int. Cl.
| | |
|---|---|
| *G01C 3/08* | (2006.01) |
| *G01C 3/32* | (2006.01) |
| *G01C 25/00* | (2006.01) |
| *G01S 17/89* | (2006.01) |

(Continued)

(52) U.S. Cl.
CPC . *G01C 3/08* (2013.01); *G01C 3/32* (2013.01); *G01C 25/00* (2013.01); *G01S 7/4815* (2013.01); *G01S 17/89* (2013.01); *G01S 17/10* (2013.01); *Y10T 29/49002* (2015.01); *Y10T 29/49117* (2015.01)

(58) Field of Classification Search
CPC ........ G02B 7/02; G02B 23/08; G02B 23/12; G02B 26/06; G02B 27/09; G02B 27/642; G01C 3/08; G01C 3/32; G01C 25/00; G01S 17/89; G01S 7/4815

USPC ........................................................ 356/4.03
See application file for complete search history.

(56) References Cited

U.S. PATENT DOCUMENTS 3,194,108 A   7/1965   Gunther
3,830,972 A   8/1974   McHugh et al.
(Continued)

FOREIGN PATENT DOCUMENTS

JP    2000-163031 A    6/2000
JP    2002-342033 A    11/2002
(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Luke Ratcliffe
*Assistant Examiner* — Vicente Rodriguez
(74) *Attorney, Agent, or Firm* — Morrison & Foerster, LLP

(57) ABSTRACT

Imaging range finding device and method are disclosed. The range finding device can include an array of emitters and photodetectors in optical communication with an imaging lens. During the range finding method, the emitters in the array can emit light that is directed by the lens toward a target object. The photodetectors in the array can detect light received from the object through the lens and onto the photodetectors. The lens, the array, or both can be movable to adjust the light emitted by the device. Characteristics of the emitted light and/or the received light can be used to find the object's range.

24 Claims, 31 Drawing Sheets

(51) Int. Cl.
*G01S 7/481* (2006.01)
*G01S 17/10* (2006.01)

(56) References Cited

U.S. PATENT DOCUMENTS

| | | | |
|---|---|---|---|
| 4,115,809 A | 9/1978 | Ueno | |
| 4,923,263 A | 5/1990 | Johnson | |
| 5,018,127 A | 5/1991 | Ando | |
| 5,309,212 A * | 5/1994 | Clark | 356/5.09 |
| 5,317,149 A | 5/1994 | Uebbing et al. | |
| 5,319,182 A | 6/1994 | Havens et al. | |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 6,875,993 B2 * | 4/2005 | Tatum et al. | 250/559.2 |
| 7,015,894 B2 | 3/2006 | Morohoshi | |
| 7,184,064 B2 | 2/2007 | Zimmerman et al. | |
| 7,345,743 B1 * | 3/2008 | Hartman et al. | 356/4.01 |
| 7,525,085 B2 | 4/2009 | Saidan et al. | |
| 7,663,607 B2 | 2/2010 | Hotelling et al. | |
| 7,751,054 B2 * | 7/2010 | Backes | 356/445 |
| 7,784,694 B2 | 8/2010 | Foo | |
| 7,796,885 B2 | 9/2010 | Dress et al. | |
| 8,231,284 B2 | 7/2012 | Doany et al. | |
| 8,358,321 B1 * | 1/2013 | Weidner | 345/659 |
| 8,479,122 B2 | 7/2013 | Hotelling et al. | |
| 2004/0114250 A1 | 6/2004 | Kato | |
| 2004/0141184 A1 * | 7/2004 | Ueki | 356/497 |
| 2005/0224695 A1 | 10/2005 | Mushika | |
| 2006/0026521 A1 | 2/2006 | Hotelling et al. | |
| 2006/0197753 A1 | 9/2006 | Hotelling | |
| 2008/0184803 A1 * | 8/2008 | Seagrave | 73/649 |
| 2009/0040532 A1 * | 2/2009 | Kawasaki et al. | 356/610 |
| 2009/0219547 A1 * | 9/2009 | Kauhanen | G01D 5/30 |
| | | | 356/615 |
| 2011/0064110 A1 | 3/2011 | Gerlach et al. | |
| 2012/0001058 A1 | 1/2012 | Luke et al. | |
| 2012/0051383 A1 * | 3/2012 | Stern | B82Y 20/00 |
| | | | 372/50.21 |
| 2014/0071427 A1 | 3/2014 | Last | |

FOREIGN PATENT DOCUMENTS

| | | |
|---|---|---|
| WO | WO-01/03255 A2 | 1/2001 |
| WO | WO-01/03255 A3 | 1/2001 |

OTHER PUBLICATIONS

Liu, Y. (Feb. 2002). "Heterogeneous Integration of OE Arrays with Si Electronics and Microoptics," IEEE Transactions on Advanced Packaging 25(1):43-49.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Schow, C.L. et al. (Apr. 1, 2009). "A Single-Chip CMOS-Based Parallel Optical Transceiver Capable of 240-Gb/s Bidirectional Data Rates," Journal of Lightwave Technology 27(7):915-929.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action mailed Aug. 27, 2014, for U.S. Appl. No. 13/708,849, filed Dec. 7, 2012, 12 pages.

Non-Final Office Action mailed Sep. 14, 2015, for U.S. Appl. No. 13/708,849, filed Dec. 7, 2012, 14 pages.

Final Office Action mailed Mar. 10, 2015, for U.S. Appl. No. 13/708,849, filed Dec. 7, 2012, 14 pages.

Final Office Action mailed Apr. 18, 2016, for U.S. Appl. No. 13/708,849, filed Dec. 7, 2012, sixteen pages.

\* cited by examiner

IMAGING RANGE FINDING DEVICE AND METHOD

FIELD

This relates generally to range finders and more specifically to range finders integrated with imaging technology.

BACKGROUND

Range finders are very popular devices for determining a proximate range or distance of a target object. One type is a camera-based range finder, which projects a field of spots onto the target object and captures an image of the spots with a remote camera. The range finder uses the parallax shift of the spots in the captured image to determine the object's range. The greater the parallax shift, the closer the object. However, the image resolution of the spots can be very poor for far objects, such that the range finder is limited to use with near objects.

Another type is an intensity-based range finder, which blasts full visible light toward the target object and captures the light the object reflects back. The range finder uses the intensity of the reflected light to determine the object's range. The dimmer the intensity, the farther the object. However, different colors can reflect different intensities, such that different-colored objects at the same range can reflect different light intensities. Similarly, if the range finder has dirt, smudges, or other particles on it, these particles can block some of the reflected light, thereby dimming the intensity of the reflected light to make the object appear farther away than it is. Or these particles can themselves reflect back light emitted by the range finder, thereby brightening the intensity of the reflected light to make the object appear closer than it is. Also, this range finder is generally limited to use with very close objects, e.g., on the order of millimeters.

A third type is a time-of-flight range finder, which emits a light pulse and detects a pulse reflected back from the target object. The range finder uses the phase shift between the emitted and reflected pulses and the speed of light to determine the time lapse between the pulses. The greater the time lapse, the farther the object. However, there are several issues with this range finder. It can be power inefficient. The emission wavelengths can interfere with the retina of the human eye, raising eye safety concerns. And the resolution can be low to moderate, making object detection less accurate.

Accordingly, currently available range finders often do not provide the desirable accuracy and performance that many applications require.

SUMMARY

This relates to an imaging range finder that can include an array of emitters and photodetectors in optical communication with an imaging lens. The emitters in the array can emit light onto the lens, which can then direct the light toward a target object. The photodetectors in the array can detect light from the object received through the lens and onto the photodetectors. The light received from the object can be the range finder's emitted light reflected back from the object and/or light generated by the object itself. In some instances, the array and the lens can be fixed. In some instances, the array can be movable using an electromechanical device so as to adjust the angle of the emitted light. In some instances, the lens can be movable using an electromechanical device so as to adjust the angle of the light passing through the lens. In some instances, a second movable lens can be added adjacent to the first movable lens. In some instances, both the lens and the array can be movable. In some instances, a prism can be disposed between the lens and the array and movable using an electromechanical device so as to adjust the apparent source of the emitted light. The imaging range finder can advantageously provide near- and far-distance object detection accuracy in a power saving and eye safe manner and in less ideal and variable object and environment conditions.

This further relates to a method for finding a range of an object using the imaging range finder.

DETAILED DESCRIPTION

Figure 1:
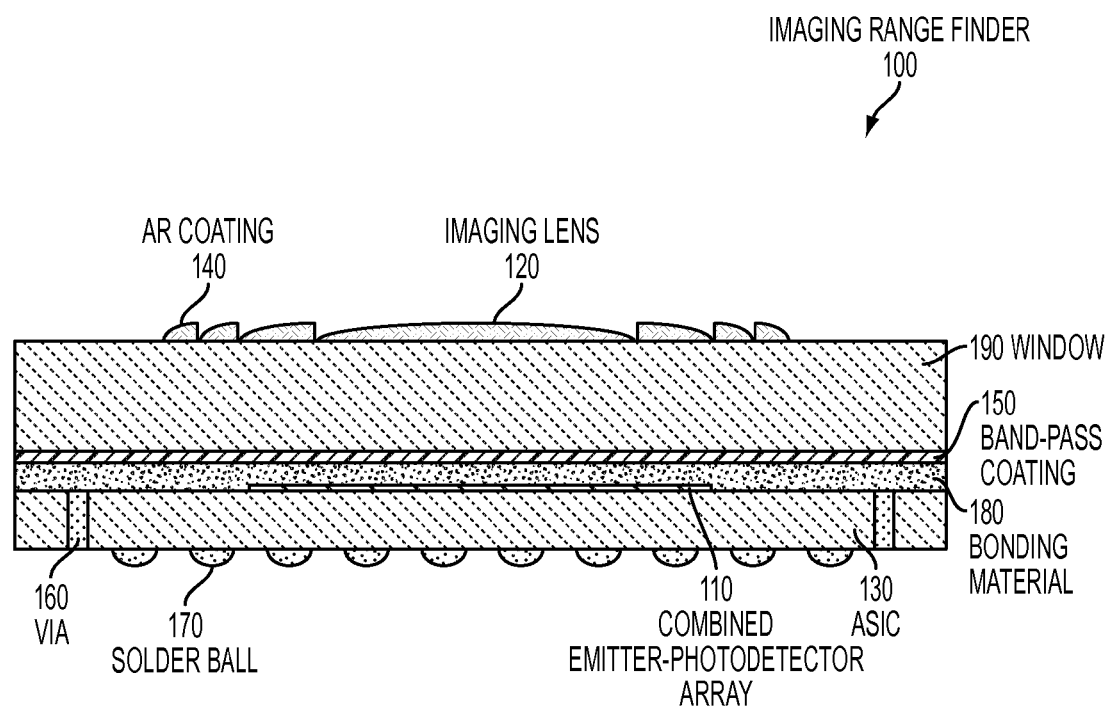
FIG. 1 illustrates an imaging range finder having a fixed array and lens according to various examples of the disclosure.

In the following description, reference is made to the accompanying drawings in which it is shown by way of illustration specific examples of the disclosure that can be practiced. It is to be understood that other examples can be used and structural changes can be made without departing from the scope of the various examples of the disclosure.

This relates to an imaging range finder and a method of finding a range of an object using the range finder. The imaging range finder can include an array of emitters and photodetectors in optical communication with an imaging lens. The emitters can emit light onto the lens, which can then direct the light toward a target object. The photodetectors can detect light from the object received through the lens and onto the photodetectors. In some examples, the light received from the object can be the range finder's emitted light reflected back from the object. In some examples, the light received from the object can be light generated by the object itself. In some examples, the light received from the object can be light generated external to both the range finder and the object and reflected from the object.

In some examples, the array and the lens can be fixed. In some examples, the array can be movable using an electromechanical device so as to adjust the angle of the emitted light. In some examples, the lens can be movable using an electromechanical device so as to adjust the angle of the light passing through the lens. In some examples, a second movable lens can be added adjacent to the first movable lens. In some examples, both the lens and the array can be movable. In some examples, a movable prism can be disposed between the lens and the array and rotated or tilted using an electromechanical device so as to adjust the apparent source of the emitted light from the emitters. In some examples, additional imaging lenses can be used to detect scattered light reflected back from the target object.

The imaging range finder according to various examples of the disclosure can provide several advantages over other range finders. For example, the range finder can emit light that has little or no spread as it travels toward the target object. As a result, a maximum amount of light can contact the target object and be reflected back to the range finder, resulting in high optical efficiency. The range finder can also provide near- and far-distance range accuracy. The range finder can operate at a wavelength longer than the range normally detected by traditional photodetectors, e.g., silicon photodetectors, so as to avoid visible light negative effects on detection, prevent or reduce adverse effects on human retinas, and "see" through less than ideal conditions of the object and the environment. The range finder can also save power.

The method of finding a range of an object using the imaging range finder can include emitting light from an emitter in the array, collimating the emitted light with the imaging lens, outputting from the lens the collimated light toward the object, receiving light reflected back from the object, and focusing the reflected light onto a photodetector in the array for processing to determine the object's range.

In some examples, the object's range can be determined based on the time lapse between the emitted light leaving the emitter and the focused light arriving at the photodetector, where the shorter the time lapse, the closer the object. In some examples, the object's range can be determined based on the intensity of the focused light received at the photodetector, where the higher the intensity, the closer the object. In some examples, the object's range can be determined from a captured image of the focused light that includes an image of the object, where the larger the relative size of the object's image, the closer the object.

In some examples, the range finder can also record sound emanating from the object, where the sound is embedded in the focused light received at the photodetector. In some examples, the range finder can also transmit data encoded in the light emitted from the emitter to the object and/or receive data encoded in the focused light received from the object. In some examples, the range finder can also detect whether the object is within a predefined space with the range finder based on light generated by the object and transmitted from the object to the photodetector in response to the emitted light from the emitter and/or light generated by the emitter and transmitted to the object in response to focused light received from the object.

Various examples of the imaging range finder are described below.

Imaging Range Finder with Fixed Array, and Lens

FIG. 1 illustrates an imaging range finder having a fixed array and lens according to various examples. In the example of FIG. 1, imaging range finder 100 can include combined emitter-photodetector array 110 for emitting and detecting light, and imaging lens 120 for collimating light emitted by the array and focusing light received from an object back onto the array. The lens 120 can be a Fresnel lens or any other suitable lens, mirror, or optical component capable of performing the lens operations. Because the lens 120 collimates the light, almost all the light that the array 110 generates can be outputted, with little or no spread, by the range finder 100.

Figure 2A:
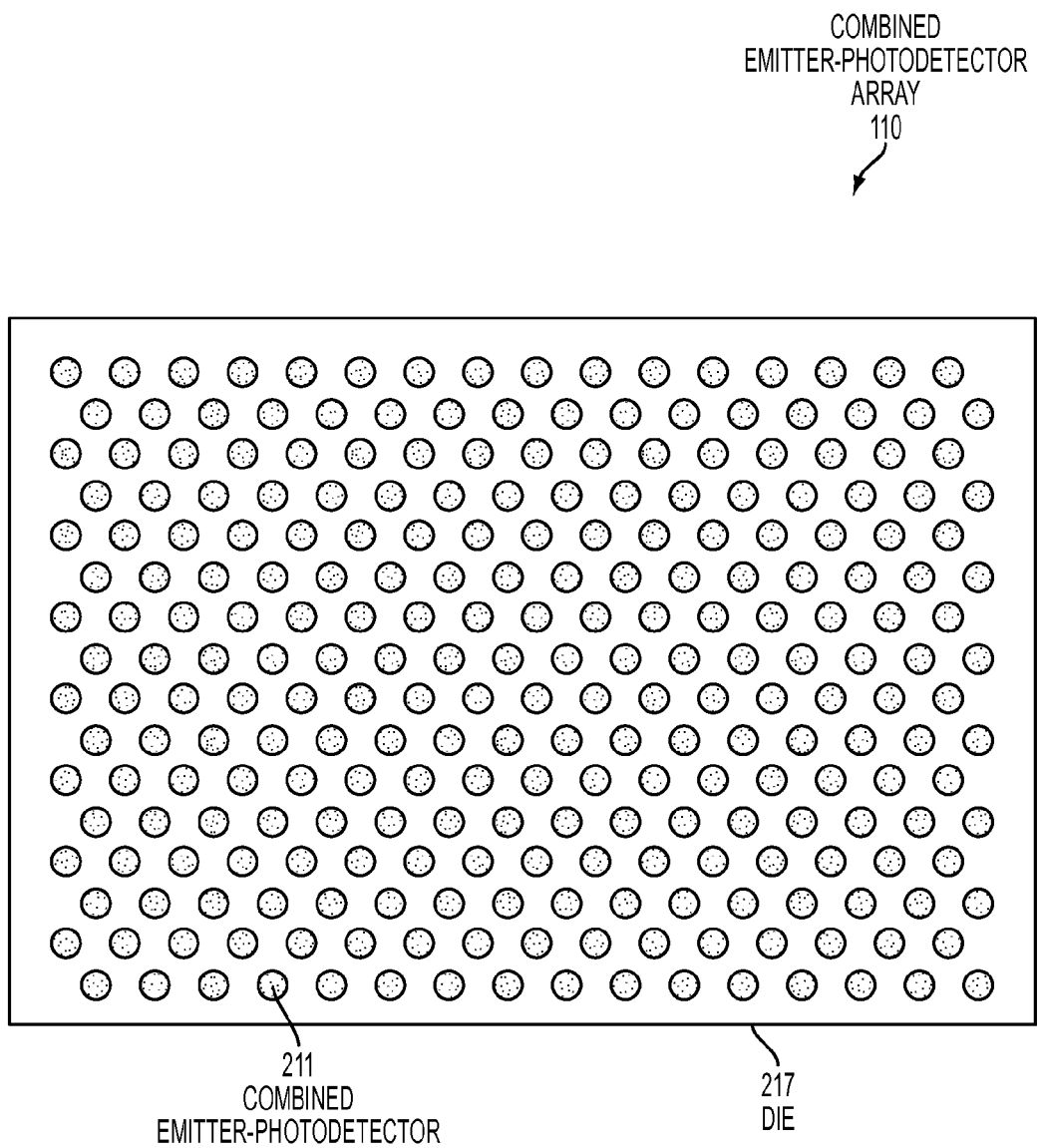
FIGS. 2A through 2C illustrate a combined emitter-photodetector array for an imaging range finder according to various examples of the disclosure.
Figure 2B:
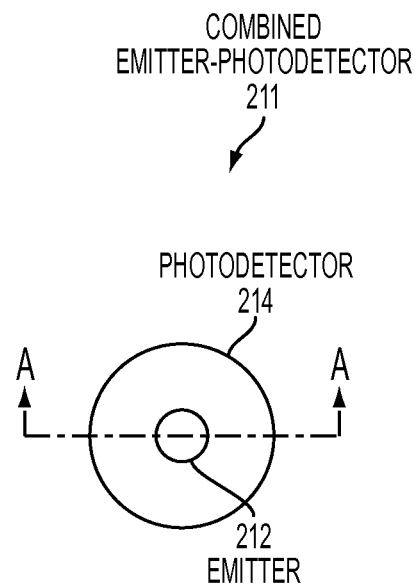
Figure 2C:
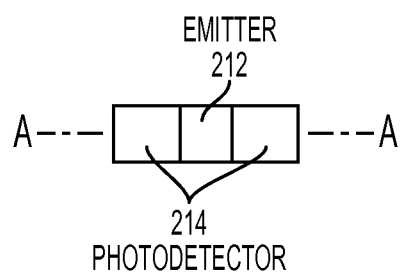

FIGS. 2A through 2C illustrate the array in more detail. In the example of FIG. 2A, the array 110 can include multiple nodes 211 on die 217 in an array configuration. Each node 211 can include a combined emitter for emitting light and photodetector for detecting light. FIGS. 2B and 2C illustrate top and cross-sectional views, respectively, of the node 211. In each node 211, emitter 212 can be in the center of the node and surrounded by photodetector 214. It should be understood that other configurations of the emitter 212 and photodetector 214 are also possible, e.g., side-by-side, the photodetector surrounded by the emitter, and so on. In some examples, the numbers of emitters and photodetectors can be the same. In some examples, the numbers of emitters and photodetectors can be different. In the example of FIG. 2A, the emitters 212 and photodetectors 214 are disposed on the same die 217. It should be understood however that more than one die can be used, where the emitters can occupy one die and the photodetectors another die. Each die can have an adjacent lens, where the emitters' lens can collimate light emitted by the emitters and the photodetectors' lens can focus reflected light onto the photodetectors. In some examples, the dies can be located together. In some examples, the dies can be located at separate locations.

The emitter 212 can be a laser, such as a vertical-cavity surface-emitting laser (VCSEL). The VCSEL can provide several advantages. It can emit light perpendicular to the array 110, providing for more efficient operation. Its compact size can allow for dense packing of multiple VCSELs on the die. Its spectral and spatial coherence allows for better collimation of the emitted light to be transmitted by the lens. The photodetector 214 can be a PIN photodiode. It should be understood that other suitable components capable of performing the functions of the emitter and the photodetector can also be used. For example, other emitters can include LEDs, optical fibers or fiber bundles, quantum dots, a micro mirror array, an LCD array, and any other components capable of releasing or generating light as described herein. Similarly, other photodetectors can include CCD sensors, LEDs, photoresisters, and any other components capable of detecting light as described herein.

In some examples, the VCSELs can emit light at a wavelength of 1000 nm or higher; more preferably, 1300 nm or higher; and most preferably, 1550 nm or higher. In some examples, the detection range of the photodetector can be matched to the emission spectrum of the VCSEL. A wavelength of 1000 nm or higher can provide several advantages. Light transmission in this wavelength range can be resistant to poor atmospheric conditions, e.g., humidity, haze, smog, fog, and so on. The atmospheric transmissivity in this wavelength range can have a value of approximately 1.0, indicating little or no absorption. Light in this wavelength range can also emit at a maximum permissible exposure (MPE) level of approximately 1 J/cm$^2$ pulses for 1 ns or longer, which is well within the levels considered safe for the eyes. The spectra of sunlight and most man-made light sources can contain less power in this wavelength range. Spectral irradiance, indicative of detectable light levels, in this wavelength range can be approximately 0.75 W/m$^2$/nm or lower, in contrast to full sunlight which has a spectral irradiance of approximately 2 W/m$^2$/nm. Light in this wavelength range can also result in less energy needed to generate photons for detection at the photodetector. Hence, the power responsivity, indicative of photodetector light-to-current conversion, can be as high as approximately 1.1 A/W and a quantum efficiency, indicative of the photodetector's light sensitivity, can be approximately 84.1% or higher for the photodetector.

Referring again to FIG. 1, in addition to the array 110 and lens 120, the imaging range finder 100 can include window 190 to hold the lens 120. The window 190 can be a transparent, high refractive index material. The range finder 100 can also include anti-reflective (AR) coating 140 on the lens 120 and band-pass coating 150 on the undersurface of the window 190. The band-pass coating 150 can match the desired wavelength range of the emitters 212, e.g., at 1000 nm or higher. The range finder 100 can include application-specific integrated circuit (ASIC) 130 to drive the array 110.

Figure 3:
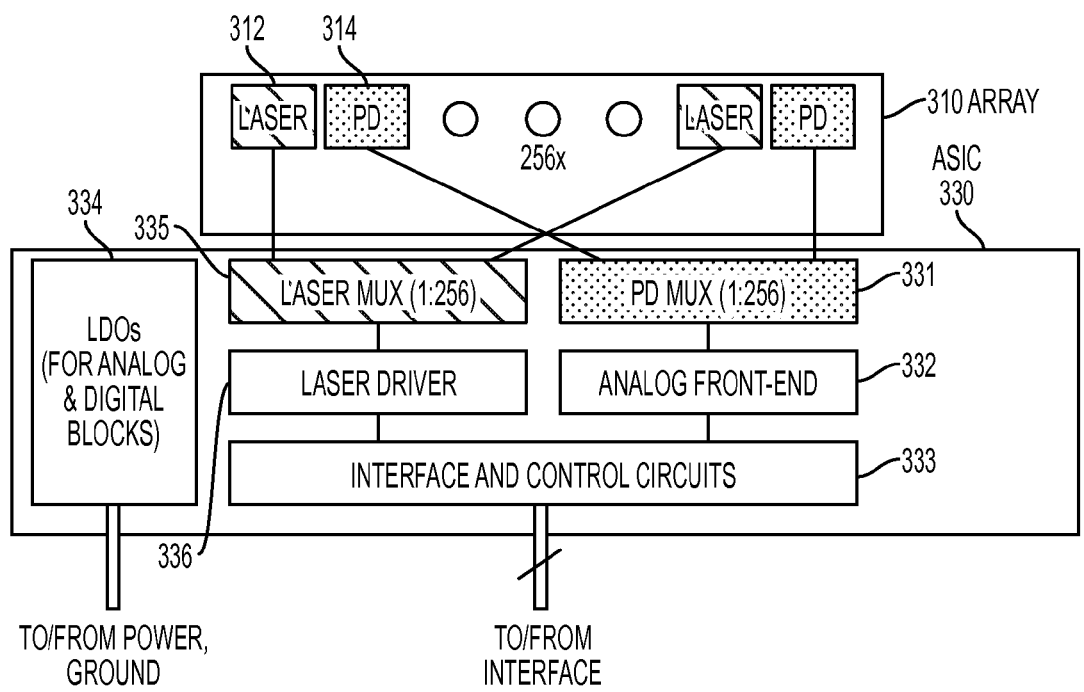
FIG. 3 illustrates driver circuitry for the imaging range finder of FIG. 1 according to various examples of the disclosure.

FIG. 3 illustrates an exemplary ASIC that can be used in the range finder 100. In the example of FIG. 3, ASIC 330 can include laser MUX 335 to select which emitter 312 in the array 310 to emit light and laser driver 336 to drive the MUX. The ASIC 330 can also include photodetector MUX 331 to select which photodetector 314 in the array 310 to detect light and analog front-end 332 to drive the MUX. The ASIC 330 can include interface and control circuits 333 to control the emitter and photodetector components such that the emitter-photodetector pairs work together during operation. The interface and control circuits 333 can also connect via an interface to external components in communication with the range finder 100. The ASIC 330 can also include voltage regulators 334, e.g., low dropout (LDO) regulators, to regulate the power supply to the ASIC.

In operation, the ASIC 330 can drive one or more of the emitters 312 and their corresponding photodetectors 314 to emit light from the selected emitters and to detect light received at the selected photodetectors.

It should be understood that the ASIC components are not limited to those described here, but can include other and/or additional components capable of driving the array according to various examples.

Referring again to FIG. 1, the imaging range finder 100 can include vias 160, e.g., a through-silicon via (TSV), through which electrical connections can be made from the power supply, processors, memory, analog circuits, and the like to electrical components in the range finder, e.g., to the ASIC 130. The range finder 100 can also include bonding material 180 to bond the array portion to the lens portion of the range finder. The bonding material 180 can be any suitable transparent, adhesive material, e.g., epoxy resin. The range finder 100 can also include solder balls 170 on the lower surface to connect the range finder to a circuit board.

The range finder 100 can operate as follows. The ASIC 130 can drive one or more of the emitters 212 in the array 110 to emit light. Multiple emission patterns can be used according to the design of the system in which the range finder 100 is to be used. For example, a single emitter 212 can be driven to emit light. Or each emitter 212 can be driven one at a time either sequentially or randomly. Or all the emitters 212 can be driven simultaneously. Or a subset of emitters 212 can be driven together, followed by another subset, and so on. The ASIC 130 can concurrently drive the photodetector(s) 214 corresponding to the driven emitter(s) 212.

The lens 120 can receive and collimate the emitted light from the emitters 212. The lens 120 can then output the collimated light toward a target object. The target object can reflect the light back to the lens 120. The lens 120 can capture the reflected light and focus it on the photodetectors 214. The photodetectors 214 driven by the ASIC 130 can detect the focused light from the lens 120 and transmit a detection signal to the ASIC 130 or other components for processing.

Figure 4A:
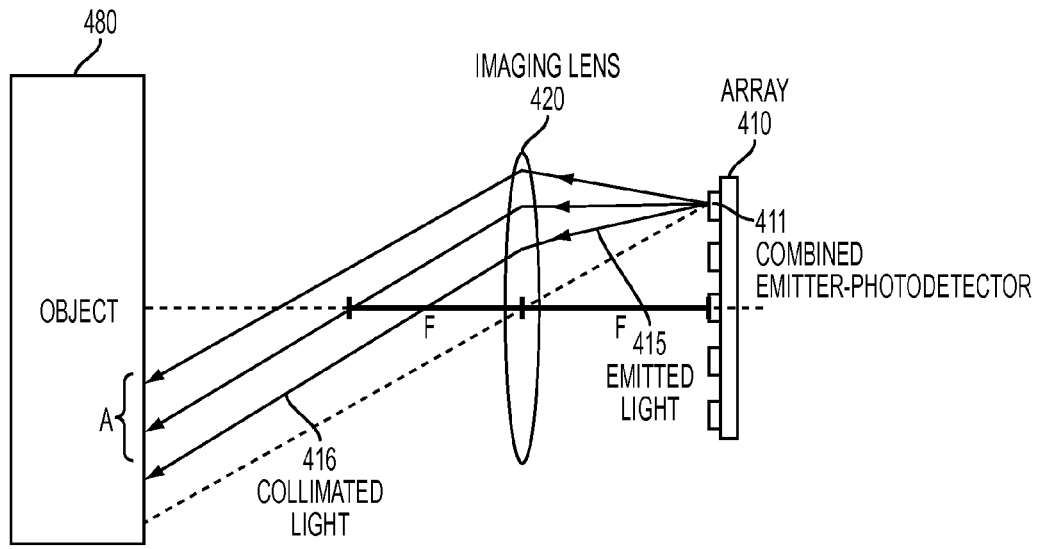
FIGS. 4A through 4D depict light paths for the imaging range finder of FIG. 1 according to various examples of the disclosure.
Figure 4B:
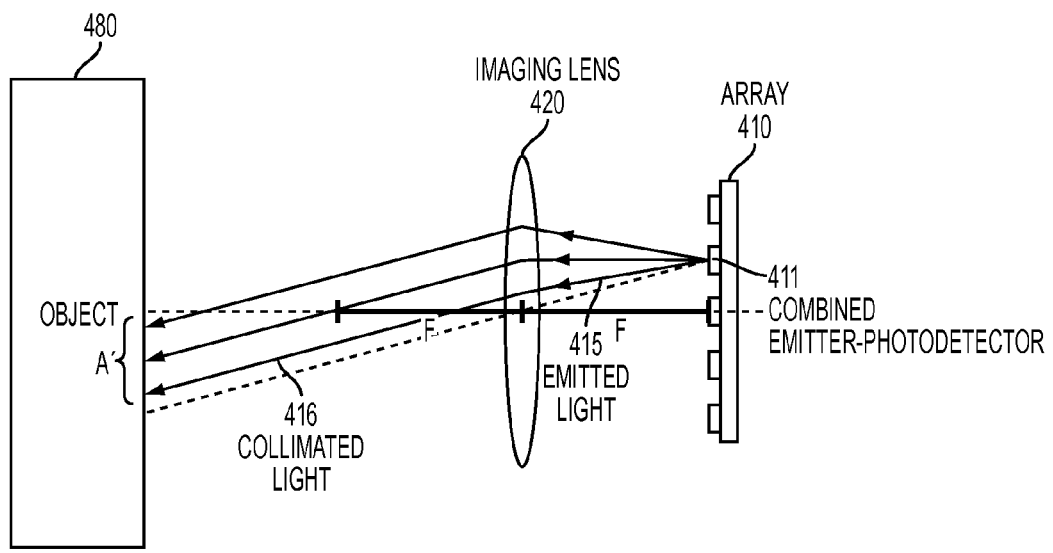
Figure 4C:
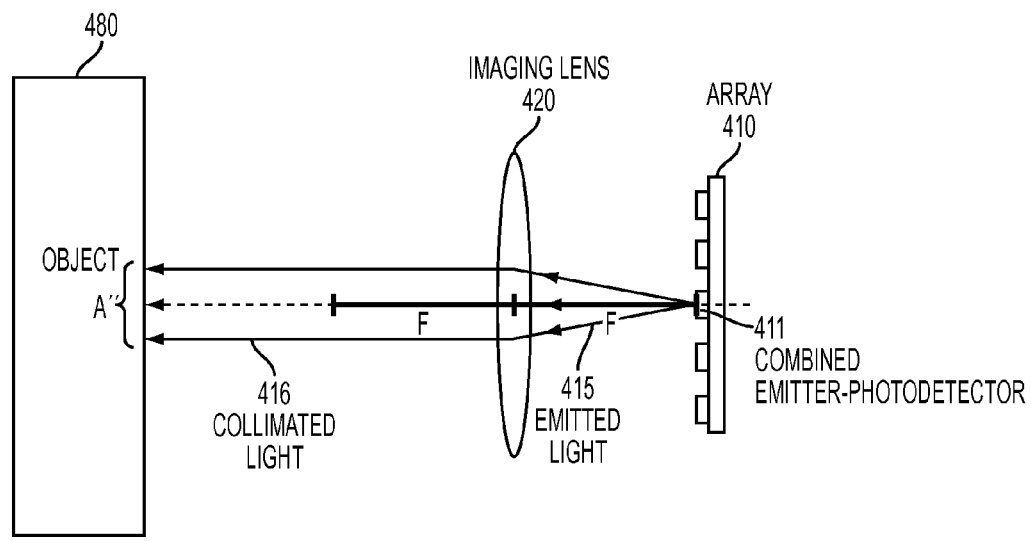

FIGS. 4A through 4D depict exemplary light paths for the range finder 100. In the example of FIG. 4A, the light path from the array 410 to object 480 is depicted when light is emitted from an emitter 411 at a first position in the array. Here, the emitter in the combined emitter-photodetector 411 can emit light 415. The imaging lens 420 can collimate the emitted light 415 and output the collimated light 416 toward the target object 480. The focal length F of the lens 420 is shown. The collimated light 416 can contact the object 480 at location A. In the example of FIG. 4B, light is emitted from an emitter 411 at a second position in the array 410. Here, the collimated light 416 can contact the object 480 at a different location A'. In the example of FIG. 4C, light is emitted from an emitter 411 at a third position in the array 410, which coincides with the center of the lens 420. Here, the collimated light 416 can contact the object 480 at another location A". FIGS. 4A through 4C demonstrate how the light path can vary depending on which emitter is used, thereby providing flexibility in directing light toward the object to get the optimal detection.

Figure 4D:
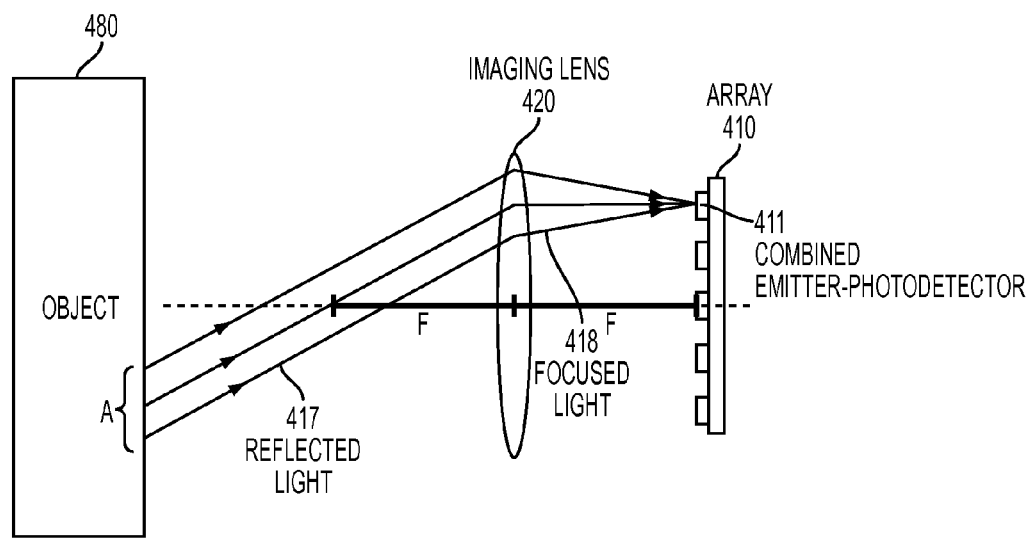

In the example of FIG. 4D, the reflected light path from the object 480 back to the array 410 is depicted. Here, the object 480 can reflect the light 417 back to the lens 420 along the reverse path that the light traveled to the object, e.g., in FIG. 4A. It should be noted that, because the object 480 typically has non-smooth surfaces, some of the reflected light can scatter away from the reverse path, though the majority of the light can tend to follow the reverse path. However, for explanatory purposes, only the light reflected along the reverse path is depicted. The lens 420 can focus the light 418 and transmit it to the photodetector in the combined emitter-photodetector 411 for detection.

FIGS. 4A through 4D depict examples in which the object reflects back the light from the range finder. It should be understood, however, that some objects can also generate their own light and transmit that light to the range finder for detection, along light paths similar to those shown in FIG. 4D. For example, another range finder or any other suitable light emitting device can generate and emit light, e.g., from location A (in FIG. 4A) toward the lens. The lens can then focus the generated light and transmit it to the photodetector in the array for detection.

Figure 5A:
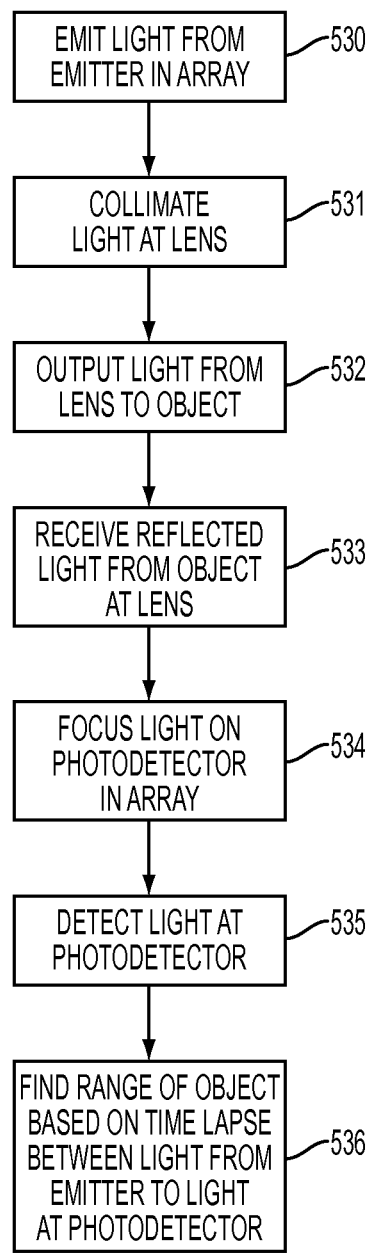
FIGS. 5A through 5F illustrate operating modes of an imaging range finder according to various examples of the disclosure.

The imaging range finder of FIG. 1 can operate in various modes. FIGS. 5A through 5F illustrate exemplary modes of operation. In the example of FIG. 5A, the range finder can operate in time-of-flight (TOF) mode, in which the range finder can use the time lapse or time difference between the emitters emitting light and the photodetectors detecting the reflected light to find the proximate range or distance of the target object. In TOF mode, one or more emitters in the array can emit light (530). The lens can collimate the emitted light (531). The lens can output the collimated light toward the target object (532). The lens can then receive back portions of the collimated light reflected from the object (533). The lens can focus the reflected light onto one or more photodetectors in the array (534). The photodetectors can detect the focused light (535). A processor can then calculate the proximate range of the object based on the time difference between the time that the emitters emitted light and the time that the photodetectors detected reflected light (536). The processor can be either the range finder ASIC or a system processor in communication with the range finder.

The time difference $t_d$ can be calculated as $t_d=(t_2-t_0)/2=t$, where time $t_0=0$, the time at which the range finder emits a light pulse; time $t_1=t$, the time at which the pulse contacts a target object; and time $t_2=2t$, twice $t_1$ and the time at which the range finder detects a light pulse reflected from the object. Because of timing issues between emitter actuation and light travel, the time difference $t_d$ can include excess time, which can result in inaccurate range calculations.

The following exemplary method can be used to improve the accuracy of the time difference $t_d$ calculation. A predefined time period can be divided into equal segments beginning at $t_0=0$. For example, a time period of 100 ns can be divided into 1 ns increments at 1 ns, 2 ns, 3 ns, and so on. The predefined time period can be longer than the time required for the light to reflect back from the object to the range finder. An emitter can emit a light pulse at $t_0=0$. A photodetector can be monitored beginning at $t_0=0$ and the detection signal of that photodetector recorded at each 1 ns increment. At around time $t_2=2t$, the corresponding 1 ns increments can show an increase in the detection signal to indicate the reflected light pulse from the object. Because of the timing issues mentioned previously, the detection signal can straddle multiple 1 ns increments, such that it is difficult to precisely determine time $t_2$.

Hence, this method can be repeated with a shift in the time segments so as to better determine time $t_2$. For example, the time segments can be shifted by $\delta$ to begin at $t_0'=0+\delta$. As such, the increments can be at 1 ns increments of $(0+\delta)$ ns, $(1+\delta)$ ns, $(2+\delta)$ ns, and so on. The emitter can emit another light pulse at $t_0=0$ and the photodetector can be monitored beginning at $t_0=0$, but with the detection signal recorded at each $+\delta$ ns increment. At around time $t_2=2t$, the corresponding $+\delta$ ns increment(s) can show an increase in the detection signal with a different distribution of the signal than previously. If time $t_2$ still cannot be determined with reasonable precision, the time segments can be shifted again by some other amount and the method repeated. In some examples, the method can be repeated approximately 10 times to determine a reasonable time $t_2$, resulting in a highly accurate proximate range calculation.

Another exemplary method to improve the accuracy of the time difference $t_d$ calculation can be as follows. An emitter can emit a light pulse toward a target object and a photodetector can detect a light pulse reflected back from the object. The processor can calculate a time difference $t_d$ for an initial coarse measurement. The emitter can then emit a pulse train toward the object. In some examples, the pulse train can be 10 or more pulses. The photodetector can detect a pulse train reflected back from the object. To determine the error in time $t_2$, the processor can pair each emitted pulse with its reflected pulse and calculate the time difference $t_d$ between each pair. For each pair, the processor can then subtract the coarse $t_d$ measurement from each pair's $t_d$ measurement. The subtraction results can be averaged and the average deemed the error in time $t_2$. Subsequent $t_d$ measurements can be adjusted using this average to eliminate or reduce this error.

It should be understood that the time difference calculations are not limited to those described herein, but can include other methods capable of improving the accuracy of the calculation.

Figure 5B:
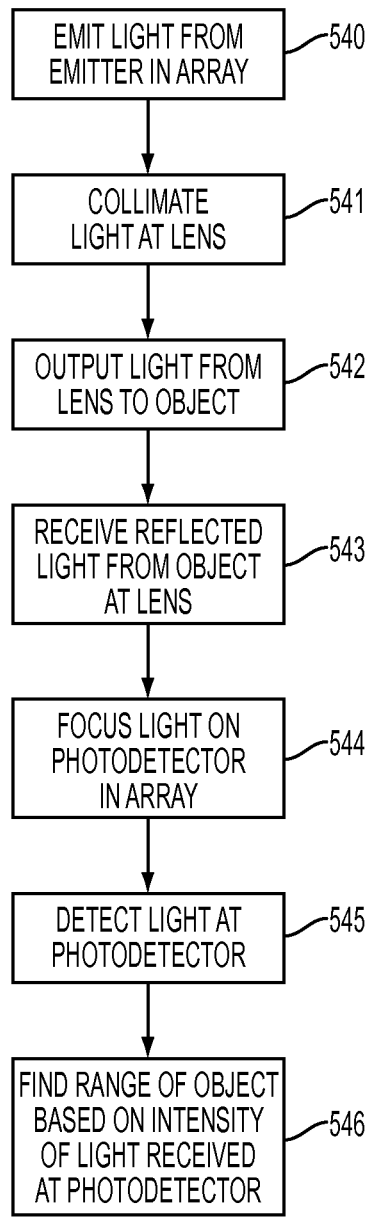

In the example of FIG. 5B, the range finder can operate in proportional-to-intensity mode, in which the range finder can use the intensity of the reflected light to find the proximate range of the target object. This mode is similar to the TOF mode of FIG. 5A with the exception of the last action (546) of FIG. 5B. Here, after the photodetectors detect the focused light (545), the processor can calculate the proximate range of the object based on the intensity of the focused light detected at the photodetectors (546). The higher the light intensity, the closer the object. When the object is closer, the lens can collect more of the reflected light from the object, thereby focusing higher intensity light on the photodetectors.

Figure 5C:
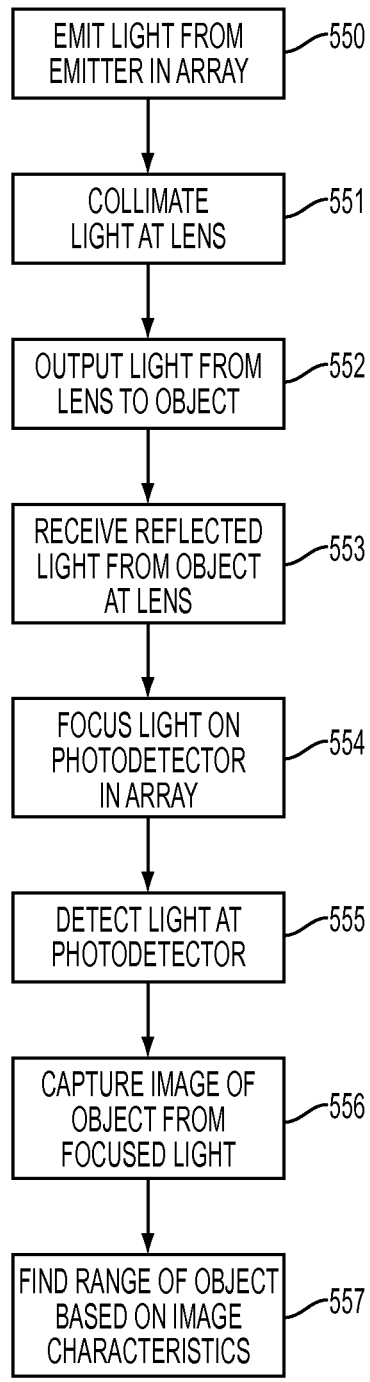

In the example of FIG. 5C, the range finder can operate in a passive mode of the proportional-to-intensity mode, in which the range finder can capture an image based on the focused light, rather than actively processing the light intensity. This mode is also similar to the TOF mode of FIG. 5A with the exception of the last actions (556-557) of FIG. 5C. Here, after the photodetectors detect the focused light (555), the processor can capture the detection signals from the photodetectors and form an image therefrom (556). The processor can then process the image to find a proximate range of the object based on characteristics of the image, e.g., the object size in the image (557). In passive mode, the range finder can also detect ambient light present in the scene with no illumination from the emitters.

Figure 5D:
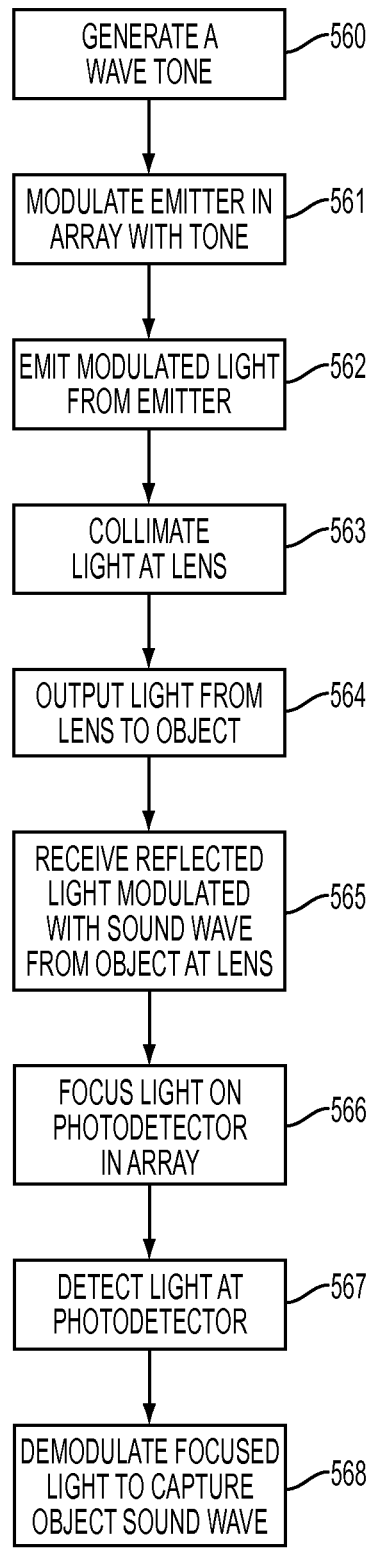

In the example of FIG. 5D, the range finder can operate in Doppler shift mode, in which the range finder can capture sound emanating from the target object. In the Doppler shift mode, the range finder can operate as a sound recorder or player. The processor can generate a sine wave tone (560) and modulate one or more emitters with the tone (561). The emitters can emit light modulated at the tone (562). The lens can collimate the emitted light (563) and output the collimated light toward the target object (564). If the object is emitting a sound wave, the sound wave can modulate the light reflected back from the object to the lens. Accordingly, the lens can receive light modulated with the object's sound wave (565). The lens can focus the modulated light on one or more photodetectors in the array (566). The photodetectors can detect the focused light (567). Upon receipt of the detection signal from the photodetectors, the processor can demodulate the focused light to capture the sound wave for recording or playback (568).

Figure 5E:
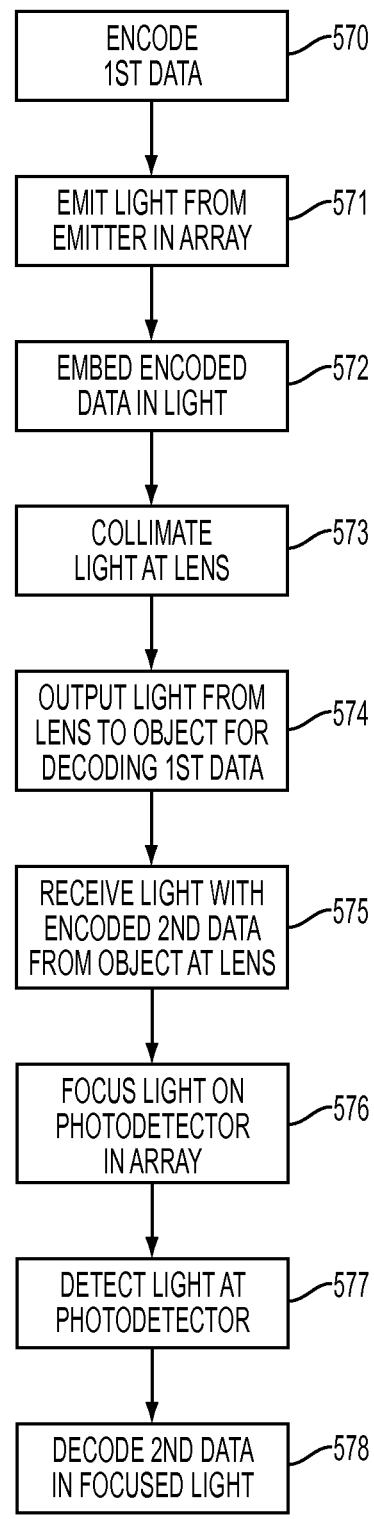

In the example of FIG. 5E, the range finder can operate in free-space optical mode, in which the range finder can transmit and receive optical communications with the target object. In this mode, the range finder can operate as a communication device. The processor can encode a first set of data (570). One or more emitters can emit light (571). The processor can embed the encoded data in the emitted light (572). The lens can collimate the light with the encoded data (573) and output the collimated light toward a target object, where the object can receive and decode the data (574). In some examples, the target object can be a second range finder or other suitable device capable of receiving and transmitting an optical communication. If the object also has data to transmit to the range finder, the object can similarly encode a second set of data, emit light, and embed the encoded data on the light transmitted from the object to the lens. If the object does not have data to transmit, the object can simply send an encoded ACK signal with the emitted light, indicating receipt of the first set of data from the range finder. Accordingly, the lens can receive light with the object's encoded data from the object (575). The lens can focus the light on one or more photodetectors in the array (576). The photodetectors can detect the focused light (577). Upon receipt of the detection signal from the photodetectors, the processor can decode the second set of data in the focused light and store the decoded data for further processing (578).

Figure 5F:
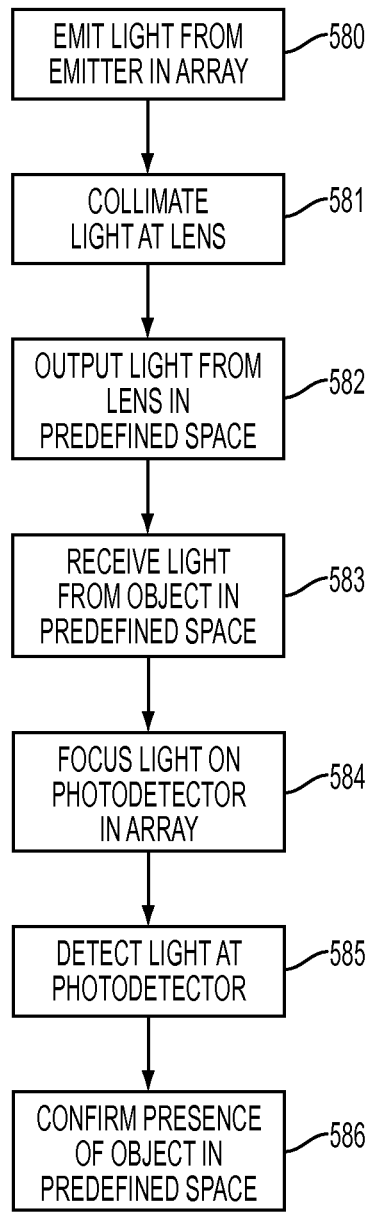

In the example of FIG. 5F, the range finder can also operate in the free-space optical mode, in which the range finder can bounce light off a surface of a predefined space, e.g., within a room, to detect the presence of one or more other objects in the same space. In this mode, the range finder can operate as an object detector. One or more emitters in the array can emit light (580). In some examples, the light can be emitted in a pattern unique to the range finder for identifying the range finder. The lens can collimate the emitted light (581) and output the collimated light toward a surface in the space, e.g., toward the ceiling, the wall, or the floor in the space (582). If a target object is in the same space, the object can detect the emitted light and emit light in response. In some examples, the target object can be a second range finder or other suitable device capable of receiving and transmitting an optical communication. In some examples, the object can emit its unique pattern for identification. Accordingly, the range finder's lens can receive the object's emitted light (583) and focus the light on one or more photodetectors in the array (584). The photo-detectors can detect the focused light (585). Upon receipt of the detection signal from the photodetectors, the processor can confirm the presence of the object in the space and, optionally, identify the object from its light pattern (586).

It should be understood that the operating modes are not limited to those described herein, but can include other modes in which the range finder can operate according to various examples.

Figure 6A:
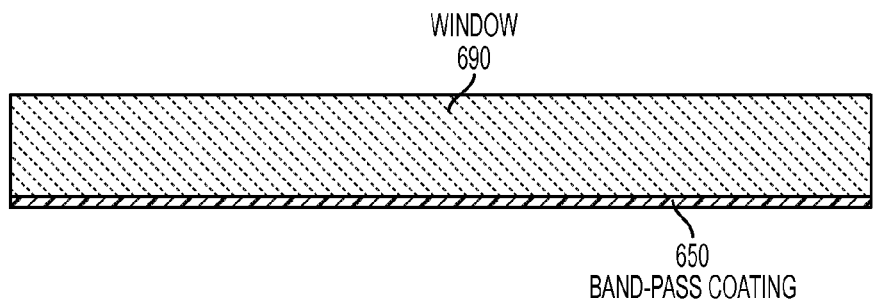
FIGS. 6A through 6D illustrate fabrication of the imaging range finder of FIG. 1 according to various examples of the disclosure.
Figure 6B:
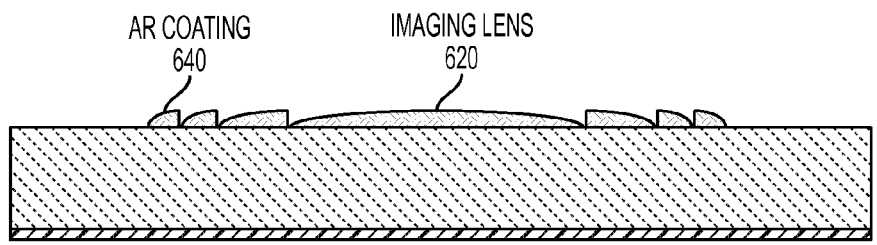

FIGS. 6A through 6D illustrate an exemplary fabrication process for the imaging range finder 100 of FIG. 1. In the example of FIG. 6A, the fabrication process can start by cutting a transparent wafer to form window 690 and sputter coating the undersurface of the window with band-pass coating 650. In some examples, the coating 650 can match the wavelength range of the emitters and photodetectors to act as a light filter. In the example of FIG. 6B, a gel material can be deposited onto the window 690, molded to form imaging lens 620, and cured with UV light. As an alternative to this gel molding, the lens 620 can be formed by molding a thermoplastic resin at elevated temperatures; molding a thermoset resin and curing at elevated temperatures; etching a profile into the transparent wafer; placing an equivalent volume of material and reflowing it to form a droplet shape in the form of a section of a sphere; diamond turning or other methods of precision machining of any suitable optical material; bonding a lens formed in a separate process to the top of the window; or the like. AR coating 640 can be deposited onto the formed lens 620 to coat the lens.

Figure 6C:
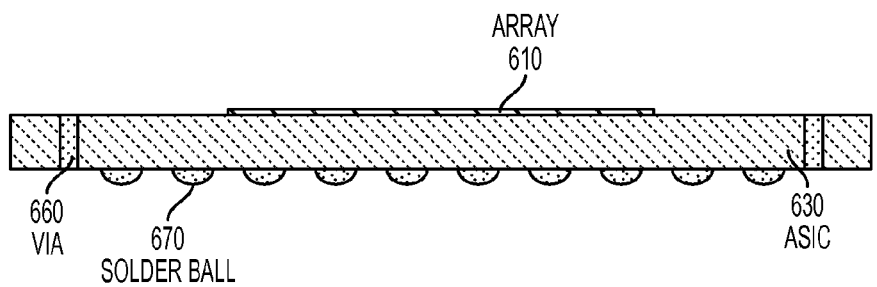
Figure 6D:
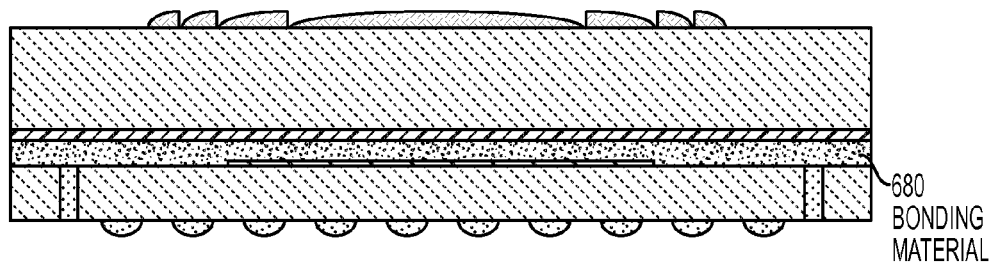

In the example of FIG. 6C, ASIC 630 can be provided and vias 660 formed in the ASIC. Solder balls 670 can be attached to the undersurface of the ASIC 630. Combined emitter-photodetector array 610 can be provided and bonded to the ASIC 630. In the example of FIG. 6D, the fabricated lens portion of FIG. 6B and the fabricated array portion of FIG. 6C can be bonded together, with the array 610 and lens 620 aligned, using bonding material 680 to form the imaging range finder 100 of FIG. 1.

It should be understood that the fabrication process is only an example, as other processes can also be used according to the available equipment and material.

Imaging Range Finder with Movable Prism

Figure 7:
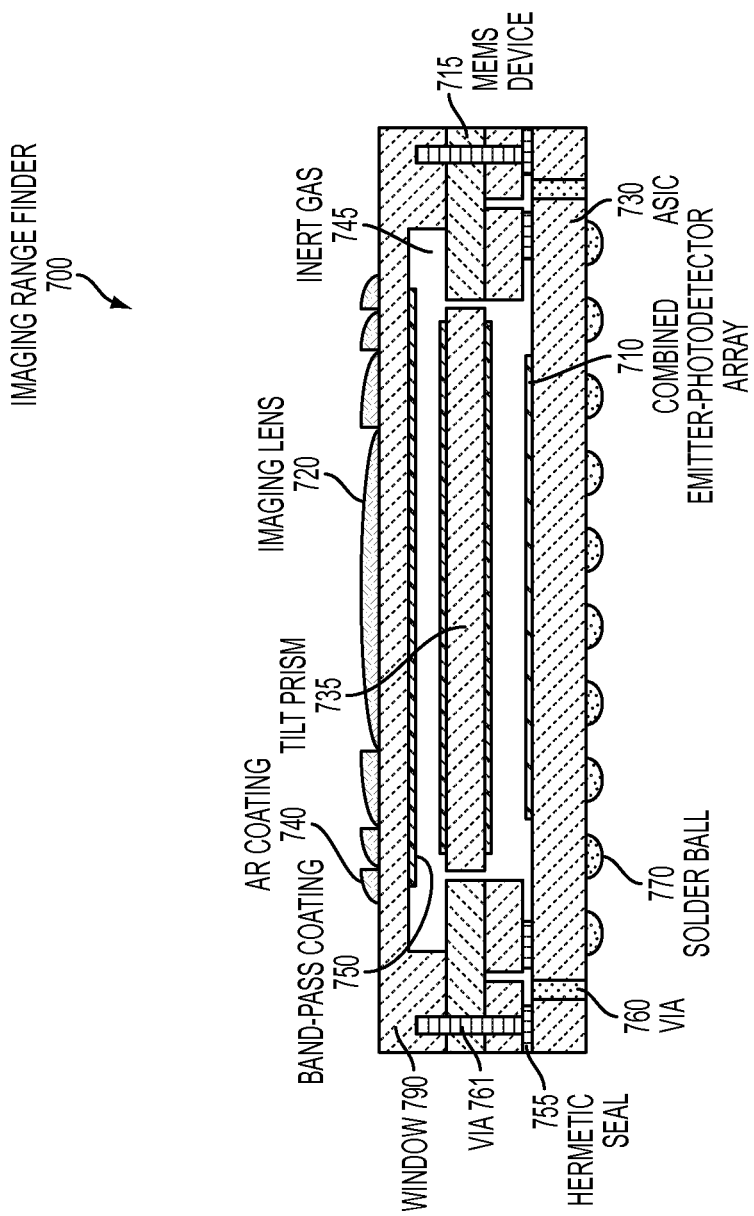
FIG. 7 illustrates an imaging range finder having a movable prism according to various examples of the disclosure.

FIG. 7 illustrates an imaging range finder having a movable prism according to various examples. The movable prism can rotate and tilt, thereby adjusting the emitted light path to different angles so that it appears as if the emitter has shifted to a new location. In some examples, the maximum shift can be ±(emitter pitch/2). This can advantageously allow the range finder to direct light at the target object so as to get the optimal detection of that object. In the example of FIG. 7, imaging range finder 700 can include combined emitter-photodetector array 710 and imaging lens 720, similar to the array 110 and lens 120 of FIG. 1. The range finder 700 can also include window 790, AR coating 740, band-pass coating 720, vias 760, 761, and solder balls 770, similar to the window 190, AR coating 140, band-pass coating 120, vias 160, and solder balls 170 of FIG. 1.

The range finder 700 can include tilt prism 735 disposed in a cavity between the array 710 and the lens 720 to adjust the transmitted and received light. The prism 735 can rotate and tilt within the cavity. Inert gas 745 or some other suitable fluid, e.g., gel, liquid, emulsion, solution, gas, and so on, can fill the cavity. AR coating 740 can coat the upper and lower surfaces of the prism 735. The range finder 700 can also include microelectromechanical (MEMS) device 715 connected to the prism 735 to rotate and tilt the prism. ASIC 730 in the range finder 700 can drive the array 710 and the MEMS device 715.

Figure 9:
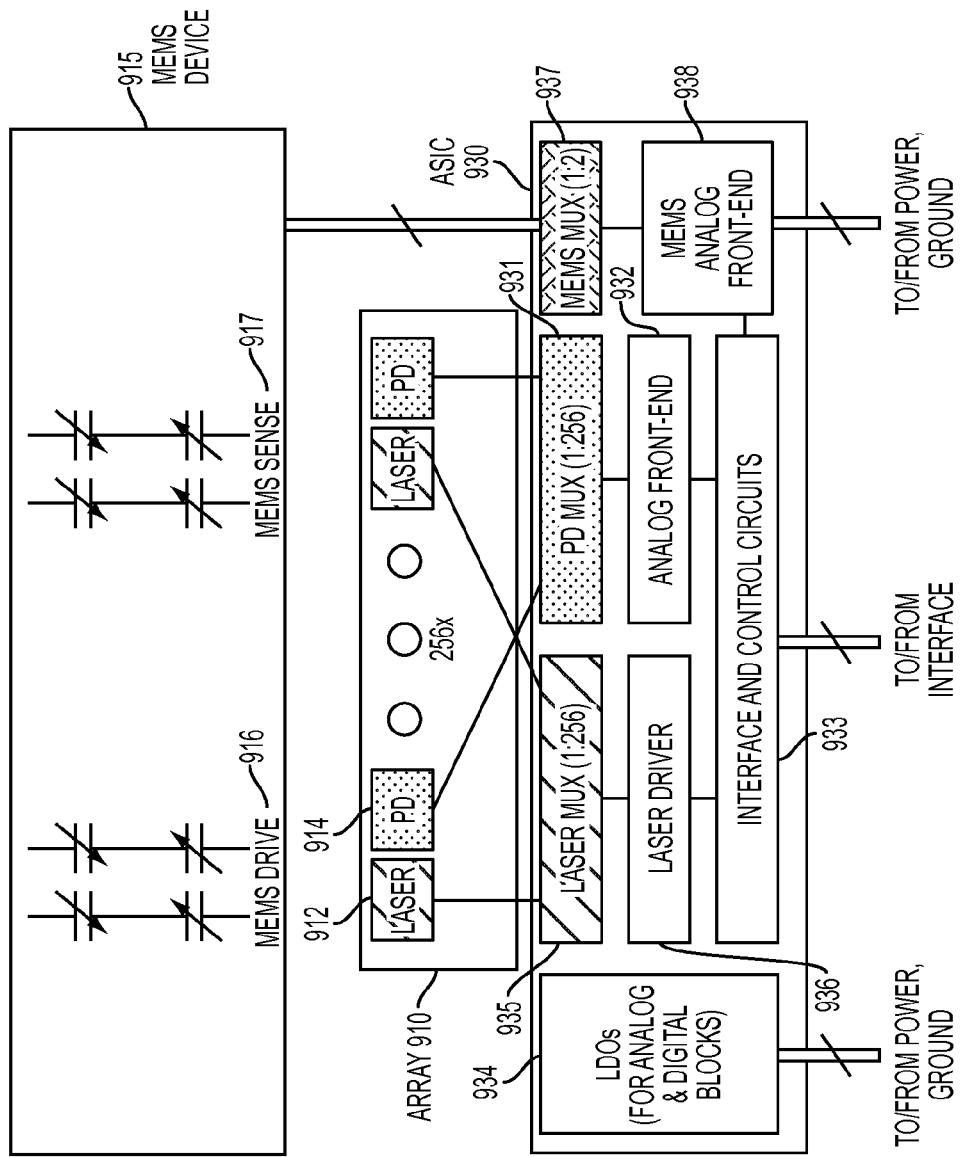
FIG. 9 illustrates driver circuitry for the imaging range finder of FIG. 7 according to various examples of the disclosure.

FIG. 9 illustrates an exemplary ASIC that can be used in the range finder 700. In the example of FIG. 9, ASIC 930 can include laser MUX 935, photodetector MUX 931, analog front-end 932, interface and control circuits 933, and voltage regulators 934, which can operate in the same or similar manner as the laser MUX 335, photodetector MUX 331, analog front-end 332, interface and control circuits 333, and voltage regulators 334 of FIG. 3.

The ASIC 930 can also include MEMS MUX 937 to select MEMS drive lines 916 and MEMS sense lines 917 in MEMS device 915. The drive lines 916 can be used to transmit control commands to the MEMS device 915 to control the rotation and tilt of the prism. The sense lines 917 can be used to transmit rotation and tilt measurements to MEMS analog front-end 938. The MEMS analog front-end 938 can drive the MUX 937 and connect to the power supply.

In operation, the ASIC 930 can drive one or more of the emitters 912 and their corresponding photodetectors 914 to emit and detect light. The ASIC 930 can concurrently drive the MEMS device 915 to move the prism 735.

Referring again to FIG. 7, the range finder 700 can operate as follows. The ASIC 730 can drive one or more of the emitters in the array 710 to emit light. As described previously in FIG. 1, multiple emission patterns can be used according to the system in which the range finder 700 is to be used. The ASIC 730 can also drive the prism 735 to transmit the emitted light from the array 710 to the lens 720. The ASIC 730 can drive the prism 735 to either a position parallel to the array 710 and the lens 720, a tilted position, or a rotated position. Depending on its position, the prism 735 can adjust the angle of the emitted light from the array 710 as the light passes through the prism. The lens 720 can receive and collimate the emitted light from the prism 735. The lens 720 can then output the collimated light toward a target object. The target object can reflect the light back to the lens 720. The lens 720 can capture and focus the reflected light. The prism 735 can transmit the focused light to the photodetectors in the array 710. Depending on its position, the prism 735 can adjust the angle of the focused light as the light passes through the prism. The photodetectors driven by the ASIC 730 can detect the focused light and transmit a detection signal to the ASIC 730 or other components for processing.

Figure 8A:
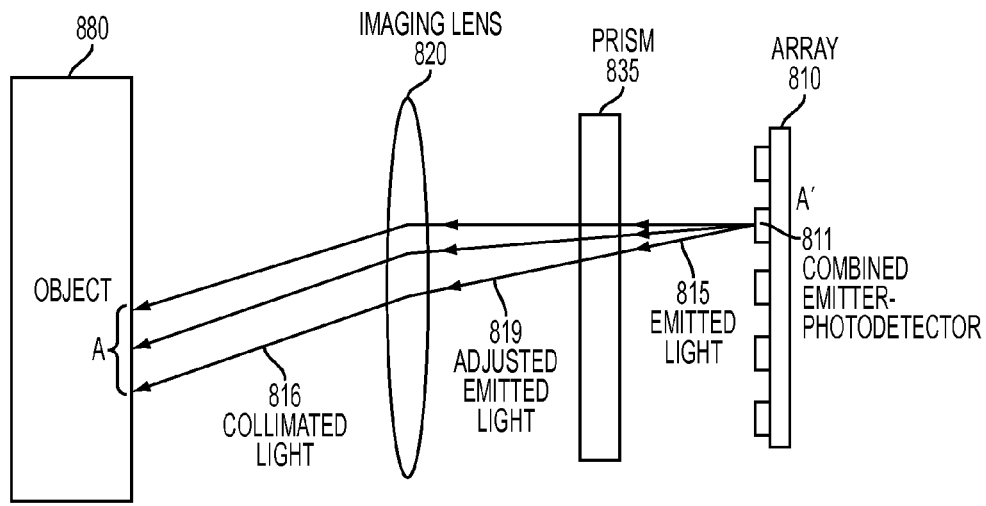
FIGS. 8A through 8E depict light paths for the imaging range finder of FIG. 7 according to various examples of the disclosure.

FIGS. 8A through 8E depict exemplary light paths for the range finder 700 based on the position of the prism. In the example of FIG. 8A, the light path from the array 810 to object 880 with a parallel prism 835 is depicted. Here, the emitter in the combined emitter-photodetector 811 can emit light 815. The parallel prism 835 can adjust the angle of the emitted light and transmit the light 819 to the lens 820. For simplicity, in this example, the portion of the parallel prism 835 through which the emitted light passes does not adjust the light angle. The lens 820 can collimate the light 819 and output the collimated light 816 toward the target object 880. The collimated light 816 can contact the object 880 at location A.

Figure 8B:
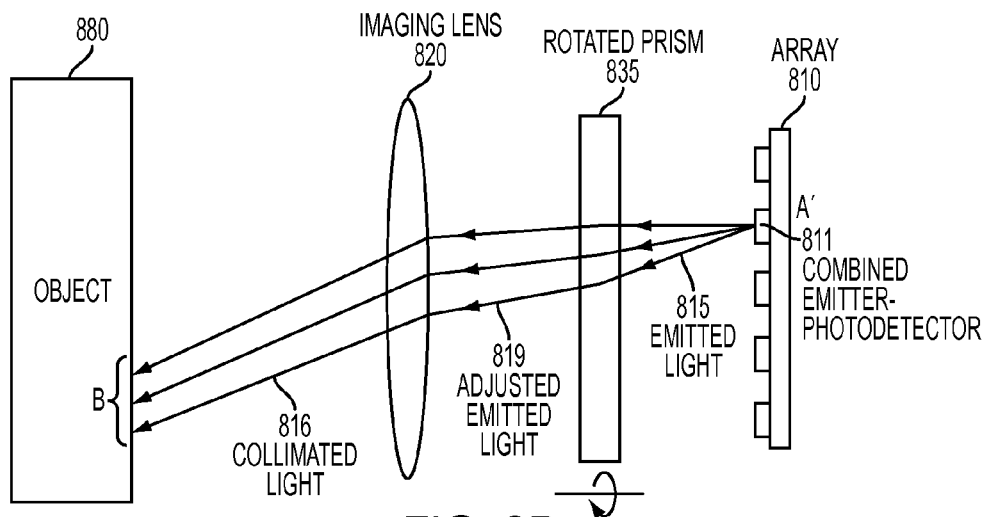

In the example of FIG. 8B, the light path from the array 810 to the object 880 is depicted in which the prism 835 has rotated. Here, the emitter can emit light 815. The portion of the rotated prism 835 through which the emitted light passes can refract the light, thereby changing the light angle. The prism 835 can transmit the adjusted emitted light 819 to the lens 820. The lens 820 can collimate the light 819 and output the collimated light 816 toward the target object 880. Because the prism 835 adjusted the light angle, the collimated light 816 can contact the object 880 at new location B, rather than location A in FIG. 8A.

Figure 8C:
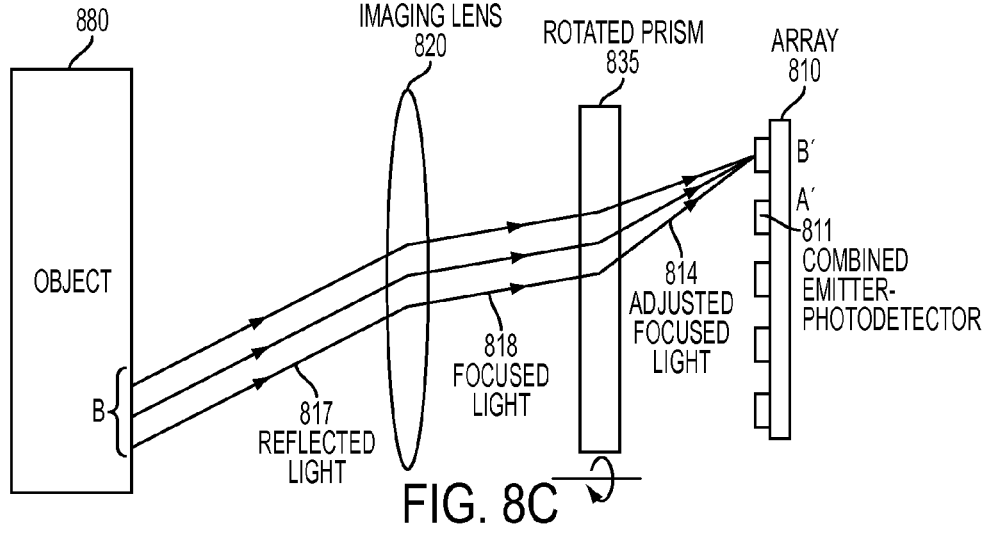

In the example of FIG. 8C, the reflected light path from the object 880 back to the array 810 is depicted in which the prism 835 has rotated. Here, the object 880 can reflect the light 817 back to the lens 820 along the reverse path that the light traveled to the object, e.g., in FIG. 8B. The lens 820 can focus the light 818 and transmit it to the rotated prism 835. The prism 835 can refract the light, thereby changing the light angle, and transmit the adjusted focused light 814 to the photodetector in the combined emitter-photodetector 811 for detection. Because the prism 835 adjusted the light angle, the focused light 814 can contact the photodetector at position B' in the array, rather than the photodetector at position A', which corresponds to the emitter that emitted the light in FIG. 8B.

Although the light 815 was emitted from the emitter at position A' in FIG. 8B, the light appears to have been emitted from the emitter at position B' in FIG. 8C. The net effect is that, because of the rotated prism 835, the emitted light can be adjusted to contact the object 880 at position B, rather than position A in FIG. 8A. As stated previously, this can advantageously allow the range finder flexibility in directing light toward the object to get the optimal detection.

Figure 8D:
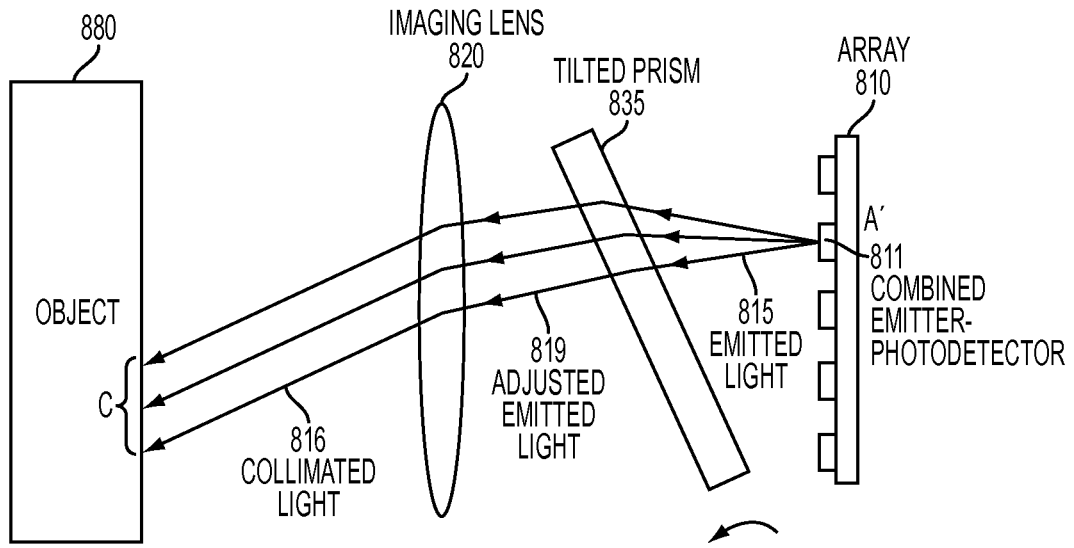

Similar results can be realized with a tilted prism. In the example of FIG. 8D, the light path from the array 810 to the object 880 is depicted in which the prism 835 has tilted. Here, the tilted prism 835 can refract the emitted light 815, thereby changing the light angle. Because the prism 835 adjusted the light angle, the collimated light 816 from the lens 820 can contact the object 880 at new location C, rather than location A in FIG. 8A or location B in FIG. 8B.

Figure 8E:
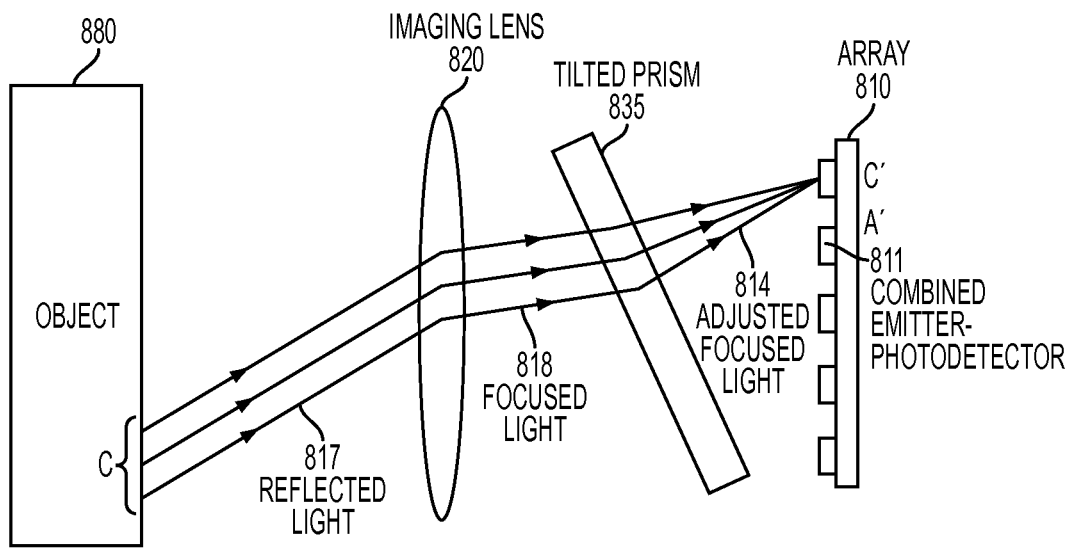

In the example of FIG. 8E, the reflected light path from the object 880 back to the array 810 is depicted in which the prism 835 has tilted. Here, the tilted prism 835 can refract the focused light 818 from the lens 820, thereby changing the light angle. Because the prism 835 adjusted the light angle, the adjusted focused light 814 can contact the photodetector at position C' in the array, rather than the photodetector at position A', which corresponds to the emitter that emitted the light in FIG. 8D.

The net effect is that, because of the tilted prism 835, the emitted light can be adjusted to contact the object 880 at position C.

Figure 10A:
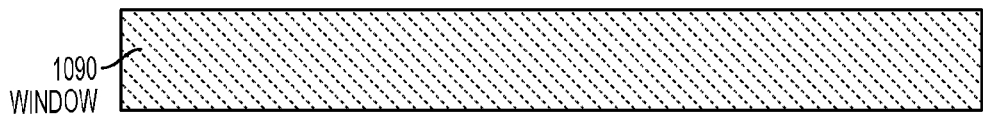
FIGS. 10A through 10E illustrate fabrication of the imaging range finder of FIG. 7 according to various examples of the disclosure.
Figure 10B:
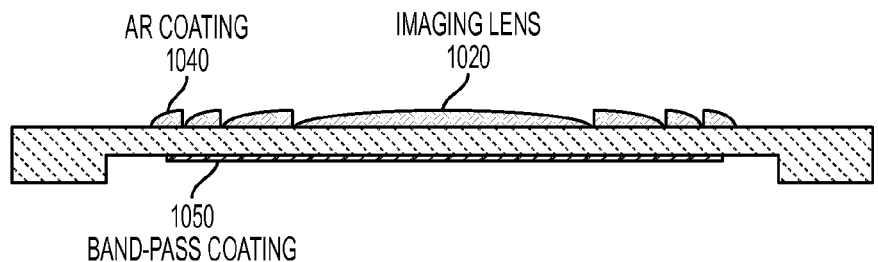

FIGS. 10A through 10E illustrate an exemplary fabrication process for the imaging range finder 700 of FIG. 7. In the example of FIG. 10A, the fabrication process can start by cutting a transparent wafer to form window 1090. In the example of FIG. 10B, the window 1090 can be thinned and a hollow etched into its undersurface. The hollow can be sputter coated with band-pass coating 1050. Imaging lens 1020 can be formed on the window 1090 using any of the methods previously described in FIG. 6B. AR coating 1040 can be deposited onto the formed lens 1020 to coat the lens.

Figure 10C:
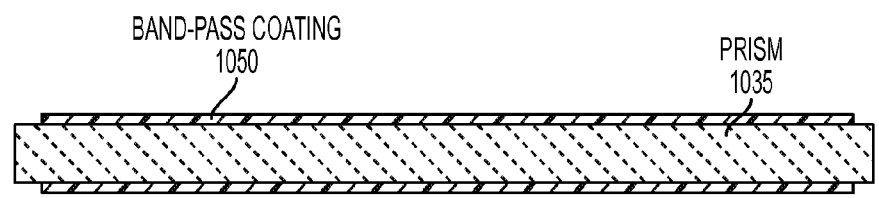
Figure 10D:
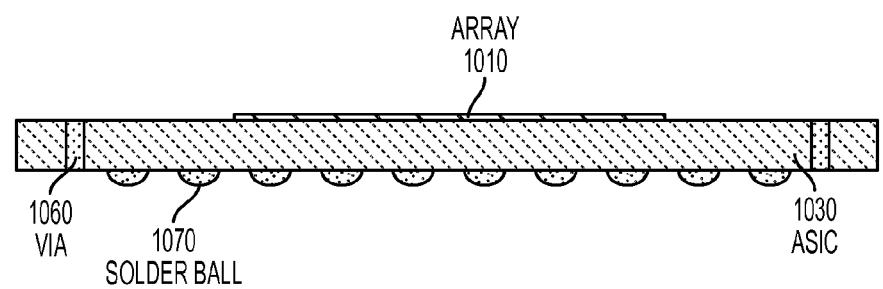

In the example of FIG. 10C, a transparent material can form prism 1035. The upper and lower surfaces of the prism 1035 can be sputter coated with band-pass coating 1050. In the example of FIG. 10D, ASIC 1030 can be provided and vias 1060 formed in the ASIC. Solder balls 1070 can be sputtered onto the undersurface of the ASIC 1030. Combined emitter-photodetector array 1010 can be provided and bonded to the ASIC 1030.

Figure 10E:
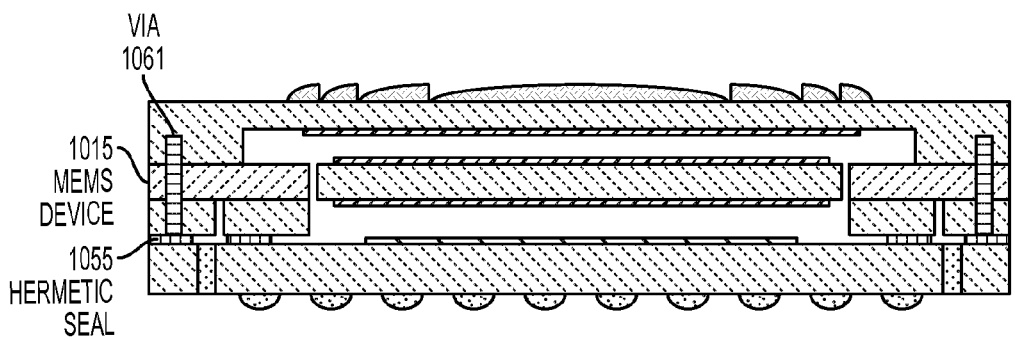

In the example of FIG. 10E, the fabricated lens portion of FIG. 10B and the fabricated array portion of FIG. 10D can be brought together to form a cavity. The prism 1035 can be positioned within the cavity. MEMS device 1015 can be provided and vias 1061 formed in the MEMS device. The MEMS device 1015 can be connected to the prism 1035. Inert gas or some other suitable material can fill the cavity. The cavity can be sealed with hermetic seal 1055 to bond the fabricated lens and array portions together, with the array 1010, prism 1035, and lens 1020 aligned, to form the imaging range finder 700 of FIG. 7.

The imaging range finder 700 of FIG. 7 can operate in any of the operating modes of FIGS. 5A through 5F.

Imaging Range Finder with Movable Array

Figure 11:
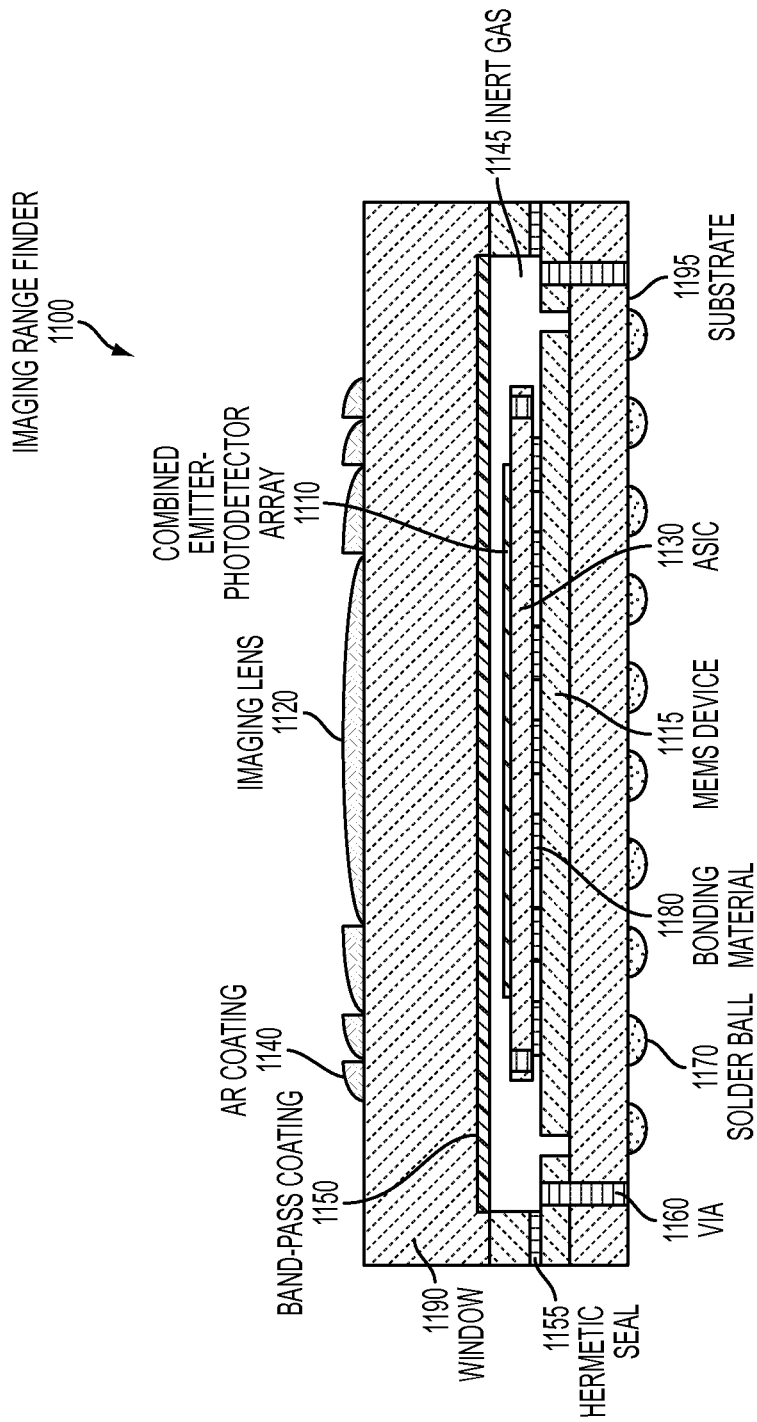
FIG. 11 illustrates an imaging range finder having a movable array according to various examples of the disclosure.

FIG. 11 illustrates an imaging range finder having a movable combined emitter-photodetector array according to various examples. The array can move along its x- and y-axes, thereby adjusting the emitted light path to different angles according to the shifted emitter position. In some examples, the maximum shift can be ±(emitter pitch/2). This can advantageously allow the range finder to direct light at the target object so as to get the optimal detection of that object. In the example of FIG. 11, imaging range finder 1100 can include combined emitter-photodetector array 1110 and imaging lens 1120, similar to the array 110 and lens 120 of FIG. 1. The range finder 1100 can also include window 1190, AR coating 1140, band-pass coating 1120, vias 1160, and solder balls 1170, similar to the window 190, coatings 140 and 120, vias 160, and solder balls 170 of FIG. 1.

The range finder 1100 can also include MEMS device 1115 to connect to the array 1110 and ASIC 1130 using bonding material 1180 to move the array within a cavity. The cavity can be formed by substrate 1195 supporting the MEMS device 1115, array 1110, and ASIC 1130 and the window 1190 supporting the lens 1120. Inert gas 1145 or some other suitable material can fill the cavity. ASIC 1130 in the range finder 1100 can drive the array 1110 and the MEMS device 1115.

Figure 13:
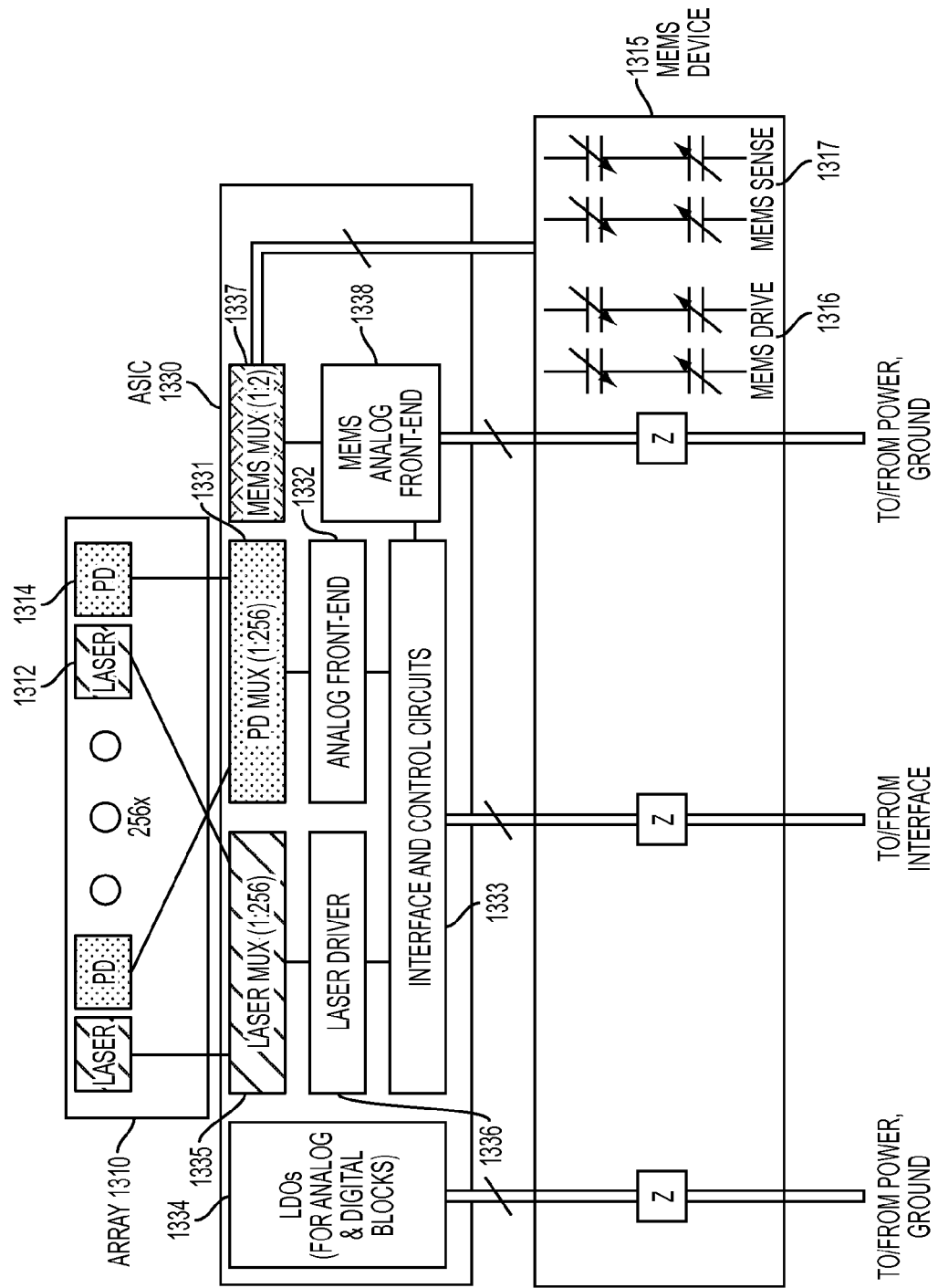
FIG. 13 illustrates driver circuitry for the imaging range finder of FIG. 11 according to various examples of the disclosure.

FIG. 13 illustrates an exemplary ASIC that can be used in the range finder 1100. In the example of FIG. 13, ASIC 1330 can be the same as the ASIC 930 in FIG. 9, except that MEMS MUX 1337 in FIG. 13 can connect to the MEMS device 1315 disposed below, instead of above, the ASIC 1330. The MEMS MUX 1337 can select MEMS drive lines 1316 and MEMS sense lines 1317 in the MEMS device 1315. The drive lines 1316 can be used to transmit control commands to the MEMS device 1315 to control the movement of the array 1310. The sense lines 1317 can be used to transmit position measurements to MEMS analog front-end 1338.

In operation, the ASIC 1330 can drive one or more of the emitters 1312 and their corresponding photodetectors 1314 to emit and detect light. The ASIC 1330 can concurrently drive the MEMS device 1315 to move the array 1310.

Referring again to FIG. 11, the range finder 1100 can operate as follows. The ASIC 1130 can drive one or more of the emitters in the array 1110 to emit light. As described previously in FIG. 1, multiple emission patterns can be used according to the system in which the range finder 1100 is to be used. The ASIC 1130 can also drive the array 1110 to move along its x- or y-axes. The lens 1120 can receive and collimate the emitted light from the array 1110. The amount that the lens 1120 refracts the emitted light as it passes through the lens can depend on the position of the emitters in the array 1110. Accordingly, if the array 1110 moves, the lens 1120 can output the collimated light toward a target object at a different angle. The target object can reflect the light back to the lens 1120. The lens 1120 can capture and focus the reflected light. The lens 1120 can transmit the focused light to one or more photodetectors in the array 1110. The photodetectors driven by the ASIC 1130 can detect the focused light and transmit a detection signal to the ASIC 1130 or other components for processing.

Figure 12A:
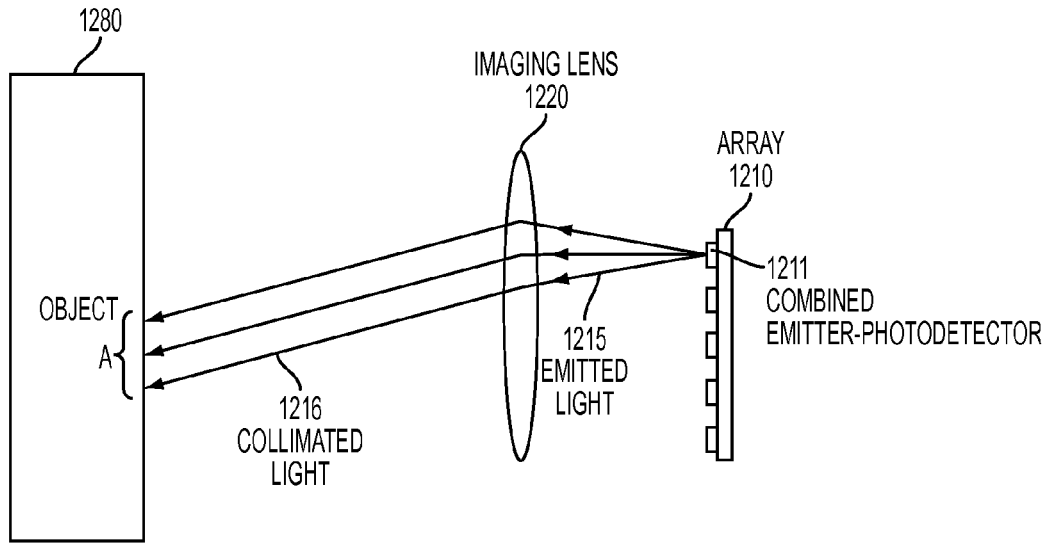
FIGS. 12A and 12B depict light paths for the imaging range finder of FIG. 11 according to various examples of the disclosure.
Figure 12B:
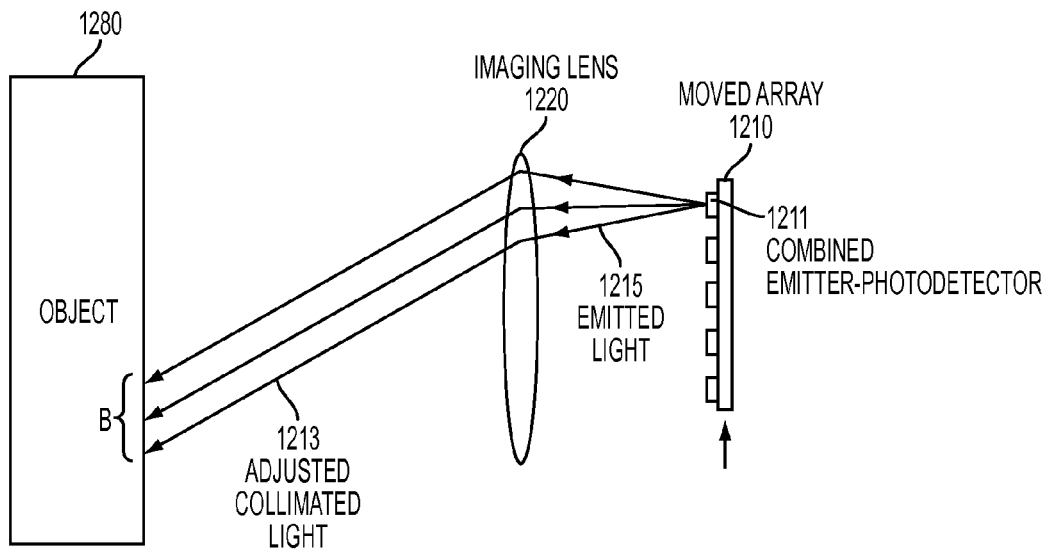

FIGS. 12A and 12B depict exemplary light paths for the range finder 1100 based on the position of the array. In the example of FIG. 12A, the light path from the array 1210 to object 1280 is depicted. Here, the emitter in the combined emitter-photodetector 1211 can emit light 1215. The lens 1220 can collimate the light 1215 and output the collimated light 1216 toward the target object 1280. The collimated light 1216 can contact the object 1280 at location A.

In the example of FIG. 12B, the light path from the array 1210 to the object 1280 is depicted in which the array 1210 has moved. Here, the emitter can emit light 1215 from a different position relative to the lens 1220. The portion of the lens 1220 through which the emitted light 1215 passes can refract the light at a different angle that in FIG. 12A, thereby changing the light angle. The lens 1220 can collimate the light 1215 and output the adjusted collimated light 1213 toward the target object 1280. Because the lens 1220 adjusted the light angle, the collimated light 1213 can contact the object 1280 at new location B, rather than location A in FIG. 12A.

The net effect is that, because of the movable array 1210, the emitted light can be adjusted to contact the object 1280 at position B, rather than position A in FIG. 12A. As stated previously, this can advantageously allow the range finder flexibility in directing light toward the object to get the optimal detection.

FIGS. 12A and 12B depict the array moving along its x-axis. Similar results can be realized with the array moving along its y-axis to move the light contact position at the target object.

Figure 14A:
FIGS. 14A through 14E illustrate fabrication of the imaging range finder of FIG. 11 according to various examples of the disclosure.
Figure 14B:
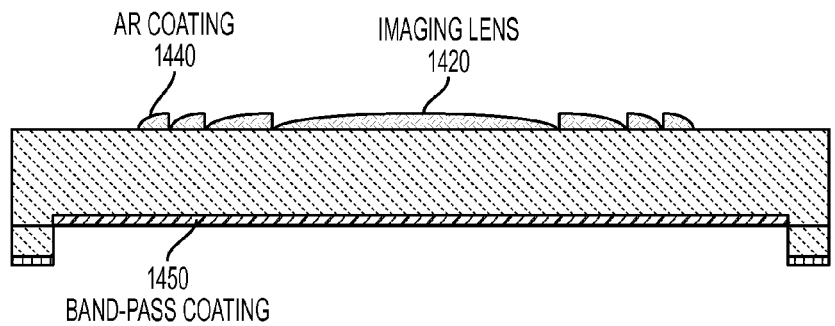

FIGS. 14A through 14E illustrate an exemplary fabrication process for the imaging range finder 1100 of FIG. 11. In the example of FIG. 14A, the fabrication process can start by cutting a transparent wafer to form window 1490 and bonding wafer 1492. The window 1490 and wafer 1492 can be bonded together. In the example of FIG. 14B, portions of the wafer 1492 can be etched away to expose the undersurface of the window 1490. The exposed undersurface can be sputter coated with band-pass coating 1450. Imaging lens 1420 can be formed on the window 1490 using any of the methods previously described in FIG. 6B AR coating 1440 can be deposited onto the formed lens 1420 to coat the lens.

Figure 14C:
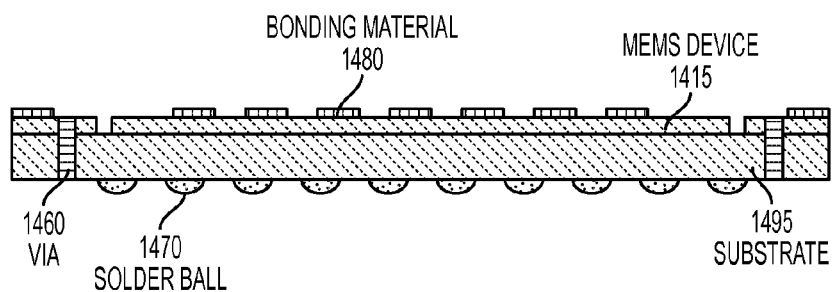
Figure 14D:
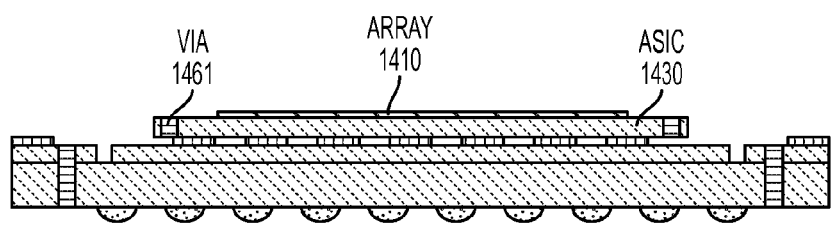

In the example of FIG. 14C, MEMS device 1415 can be provided and bonded to substrate 1495. Solder balls 1470 can be sputtered onto the undersurface of the substrate 1495. Vias 1460 can be formed in the substrate 1495. Bonding material 1480 can be deposited onto the MEMS device 1415 in preparation for bonding combined emitter-photodetector array 1410 and ASIC 1430 thereto. In the example of FIG. 14D, the array 1410 and ASIC 1430 can be provided and bonded together. Vias 1461 can be formed in the ASIC 1430. The bonded array 1410 and ASIC 1430 can be bonded to the MEMS portion by the bonding material 1480.

Figure 14E:
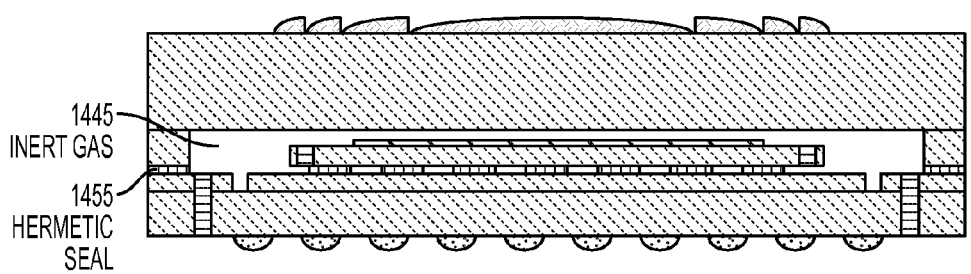

In the example of FIG. 14E, the fabricated lens portion of FIG. 14B and the fabricated array portion of FIG. 14D can be brought together to form a cavity. Inert gas or some other suitable material can fill the cavity. The cavity can be sealed with hermetic seal 1455 to bond the fabricated lens and array portions together, with the array 1410 and lens 1420 aligned, to form the imaging range finder 1100 of FIG. 11.

The imaging range finder 1100 of FIG. 11 can operate in any of the operating modes of FIGS. 5A through 5F.

Imaging Range Finder with Movable Lens

Figure 15:
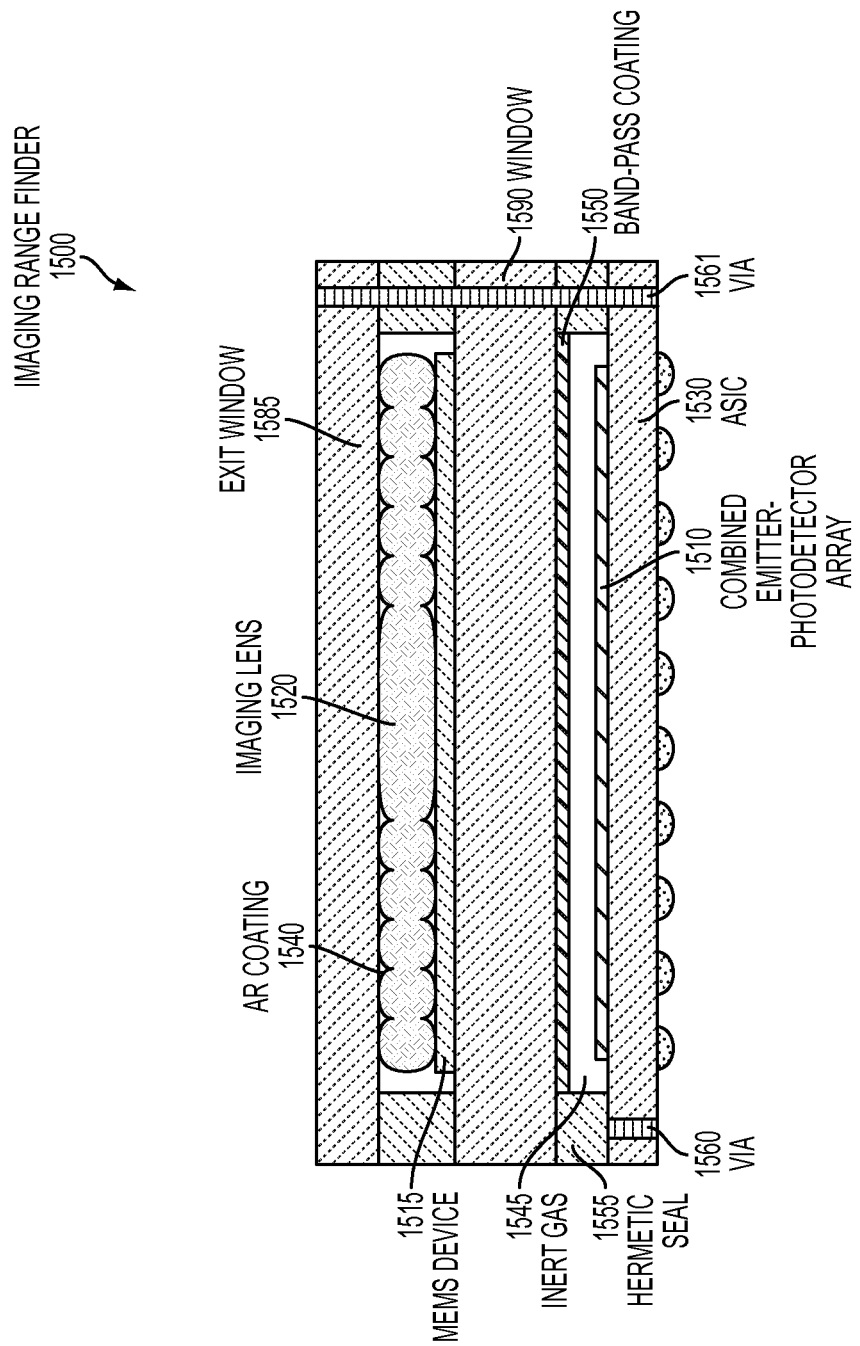
FIG. 15 illustrates an imaging range finder having a movable imaging lens according to various examples.

FIG. 15 illustrates an imaging range finder having a movable imaging lens according to various examples. The lens can move along its x- and y-axes, thereby adjusting the collimated light path to different angles according to the shifted lens position. This can advantageously allow the range finder to direct light at the target object so as to get the optimal detection of that object. In the example of FIG. 15, imaging range finder 1500 can include combined emitter-photodetector array 1510, similar to the array 110 of FIG. 1. The range finder 1500 can also include window 1590, AR coating 1540, band-pass coating 1520, vias 1560, 1561, and solder balls 1570, similar to the window 190, coatings 140 and 120, vias 160, and solder balls 170 of FIG. 1.

The range finder 1500 can include imaging lens 1520, similar to the lens 120 of FIG. 1. Here, the lens 1520 can be either a single- or double-sided Fresnel lens or any other lens suitable for the range finder.

The range finder 1500 can further include MEMS device 1515 to connect to the lens 1520 to move the lens within a cavity. The cavity can be formed by the window 1590 and exit window 1585. ASIC 1530 can support the array 1510 within a second cavity formed by the ASIC and the window 1590. Inert gas 1545 or some other suitable material can fill the lens cavity and/or the array cavity. ASIC 1530 can drive the array 1510 and the MEMS device 1515.

The ASIC 1530 can have the same or similar configuration as the ASIC 930 in FIG. 9. The ASIC 1530 can operate in a similar manner as well, except the ASIC 1530 can drive the MEMS device 1515 to move the lens 1520, rather than the prism 735 of FIG. 7.

The range finder 1500 can operate as follows. The ASIC 1530 can drive one or more of the emitters in the array 1510 to emit light. As described previously in FIG. 1, multiple emission patterns can be used according to the system in which the range finder 1500 is to be used. The ASIC 1530 can also drive the lens 1520 to move along its x- or y-axes. The lens 1520 can receive and collimate the emitted light from the array 1510. The amount that the lens 1520 refracts the emitted light as it passes through the lens can depend on the position of the lens. Accordingly, if the lens 1520 moves, it can output the collimated light toward a target object at a different angle. The target object can reflect the light back to the lens 1520. The lens 1520 can capture and focus the reflected light and can transmit the focused light to one or more photodetectors in the array 1510. The photodetectors driven by the ASIC 1530 can detect the focused light and transmit a detection signal to the ASIC 1530 or other components for processing.

Figure 16A:
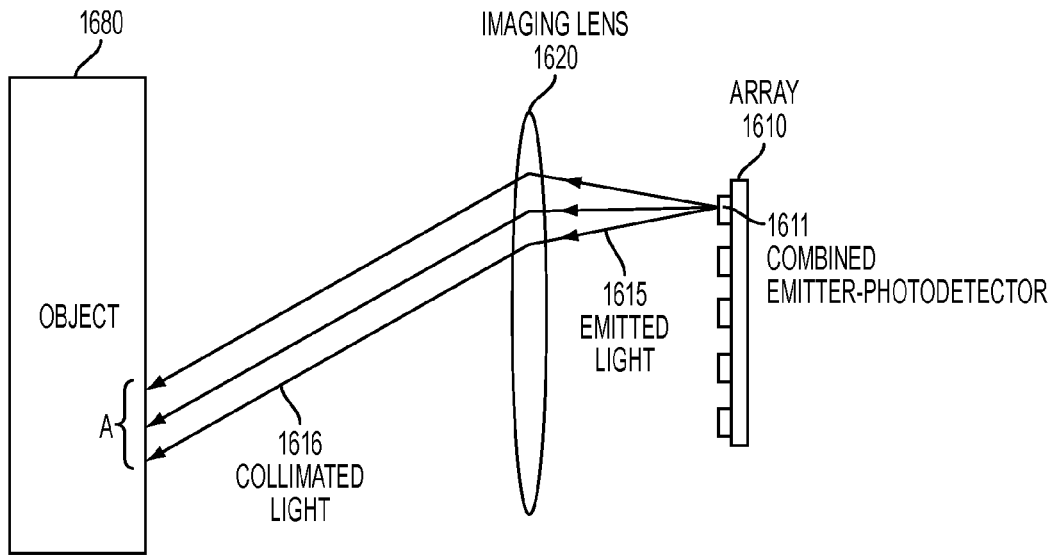
FIGS. 16A and 16B depict light paths for the imaging range finder of FIG. 15 according to various examples of the disclosure.
Figure 16B:
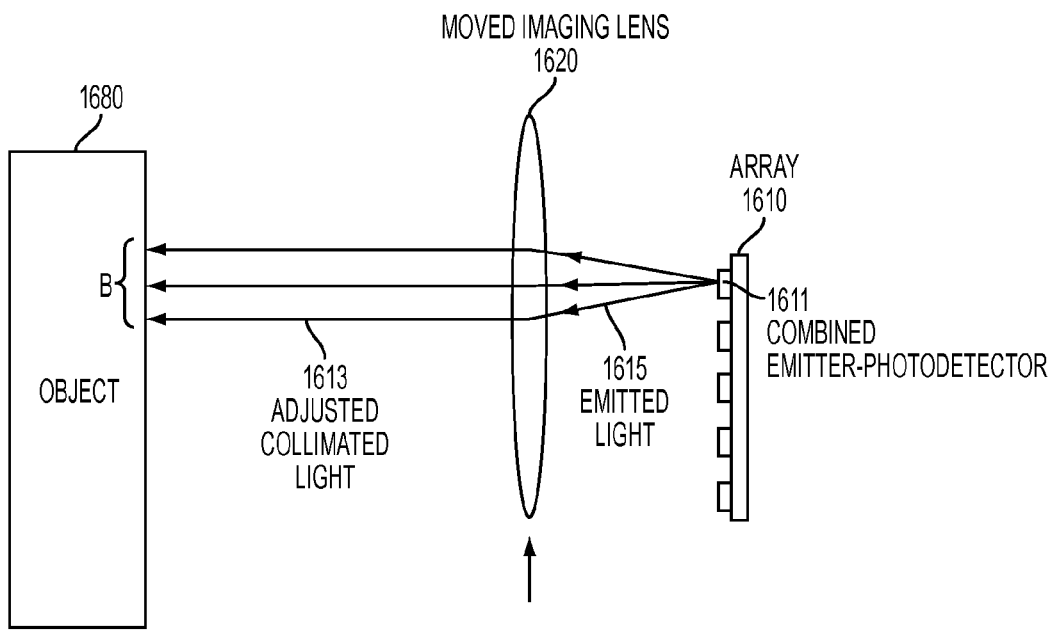

FIGS. 16A and 16B depict exemplary light paths for the range finder 1500 based on the position of the lens. In the example of FIG. 16A, the light path from the array 1610 to object 1680 is depicted. Here, the emitter in the combined emitter-photodetector 1611 can emit light 1615. The lens 1620 can collimate the light 1615 and output the collimated light 1616 toward the target object 1680. The collimated light 1616 can contact the object 1680 at location A.

In the example of FIG. 16B, the light path from the array 1610 to the object 1680 is depicted in which the lens 1620 has moved. Here, the emitter can emit light 1615 and contact the lens 1620 at a different position because the lens has moved. The portion of the lens 1620 through which the emitted light 1615 passes can refract the light at a different angle that in FIG. 16A, thereby changing the light angle. The lens 1620 can collimate the light 1615 and output the adjusted collimated light 1613 toward the target object 1680. Because the lens 1620 adjusted the light angle, the collimated light 1613 can contact the object 1680 at new location B, rather than location A in FIG. 16A.

The net effect is that, because of the movable lens 1620, the emitted light can be adjusted to contact the object 1680 at position B in FIG. 16B, rather than position A in FIG. 16A. As stated previously, this can advantageously allow the range finder flexibility in directing light toward the object to get the optimal detection.

FIGS. 16A and 16B depict the lens moving along its x-axis. Similar results can be realized with the lens moving along its y-axis to move the light contact position at the target object.

Figure 17A:
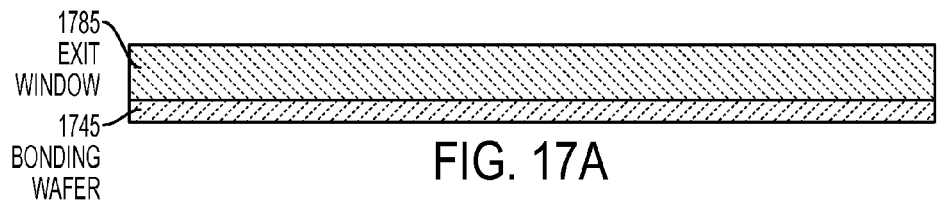
FIGS. 17A through 17F illustrate fabrication of the imaging range finder of FIG. 15 according to various examples of the disclosure.
Figure 17B:
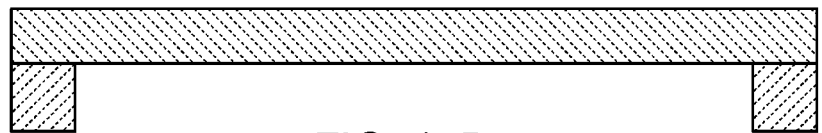

FIGS. 17A through 17F illustrate an exemplary fabrication process for the imaging range finder 1500 of FIG. 15. In the example of FIG. 17A, the fabrication process can start by cutting a transparent wafer to form exit window 1785 and bonding wafer 1792. The exit window 1785 and wafer 1792 can be bonded together. In the example of FIG. 17B, portions of the wafer 1792 can be etched away to expose the undersurface of the exit window 1785, forming a hollow for housing imaging lens 1720.

Figure 17C:
Figure 17D:
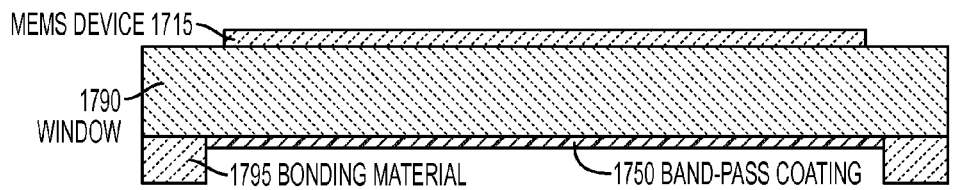

In the example of FIG. 17C, imaging lens 1720 can be formed using any of the methods previously described in FIG. 6B. AR coating 1740 can be deposited onto the formed lens 1720 to coat the lens. In the example of FIG. 17D, a transparent wafer can be cut to form window 1790. MEMS device 1715 can be provided and bonded to the window 1790. The undersurface of the window 1790 can be sputter coated with band-pass coating 1750. Bonding material 1795 can be deposited on the undersurface in preparation for bonding with ASIC 1730.

Figure 17E:
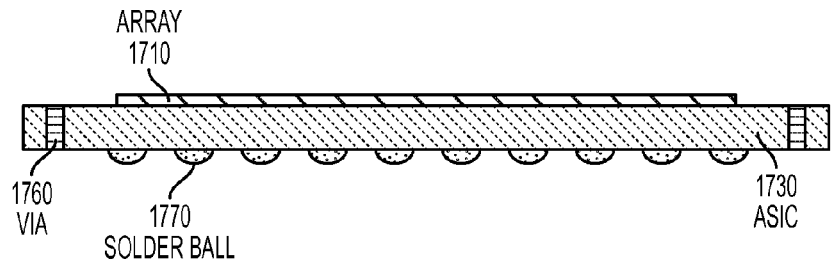

In the example of FIG. 17E, ASIC 1730 can be provided and vias 1760 formed in the ASIC. Solder balls 1770 can be sputtered onto the undersurface of the ASIC 1730. Combined emitter-photodetector array 1710 can be provided and bonded to the ASIC 1730.

Figure 17F:
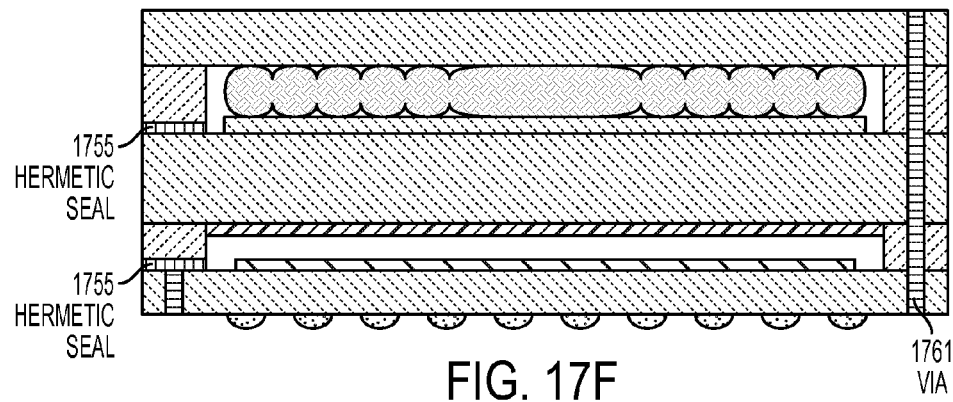

In the example of FIG. 17F, the fabricated exit window portion of FIG. 17B and the fabricated MEMS portion of FIG. 17D can be put together to form a cavity. The lens 1720 can be positioned on the MEMS device 1715 within the cavity. The cavity can be sealed with hermetic seal 1755. This structure can be put together with the fabricated array portion of FIG. 17E to form a second cavity therebetween. The second cavity can also be sealed with the hermetic seal 1755. Inert gas or some other suitable material can fill either or both the cavities. The via 1761 in the ASIC 1730 can be extended through the window 1790 and bonding material 1795 to allow electric connection to the MEMS device 1715. The resulting structure, with the array 1710 and lens 1720 aligned, can form the imaging range finder 1500 of FIG. 15.

The imaging range finder 1500 of FIG. 15 can operate in any of the operating modes of FIGS. 5A through 5F.

Imaging Range Finder with Movable Array and Lens

Figure 18:
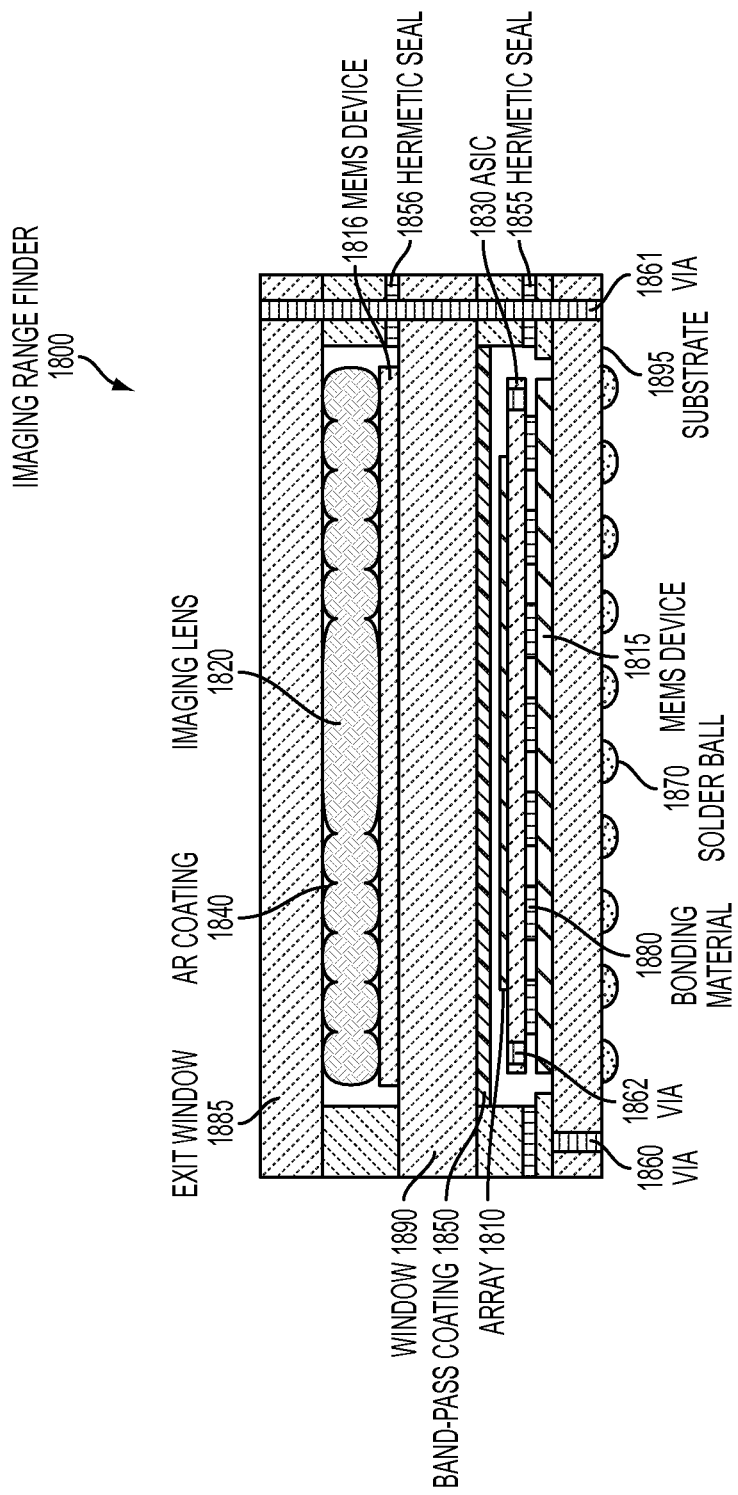
FIG. 18 illustrates an imaging range finder having a movable array and a movable imaging lens according to various examples of the disclosure.

FIG. 18 illustrates an imaging range finder having both a movable imaging lens and a movable array according to various examples. The lens and the array can move along their respective x- and y-axes, thereby adjusting the light path to different angles according to the shifted lens and array positions. This can advantageously allow the range finder to direct light at the target object so as to get the optimal detection of that object.

In the example of FIG. 18, imaging range finder 1800 can include combined emitter-photodetector array 1810 and imaging lens 1820. The array 1810 can be the same or similar to the array 110 of FIG. 1. The range finder 1800 can also include first MEMS device 1815 to connect to the array 1810 and ASIC 1830 using bonding material 1880 to move the array within a cavity. The cavity can be formed by substrate 1895 supporting the first MEMS device 1815, array 1810, and ASIC 1830 and by window 1890 supporting the lens 1820 and second MEMS device 1816.

The lens 1820 can be the same or similar to the lens 1510 of FIG. 15. The second MEMS device 1816 can connect to the lens 1820 to move the lens within a second cavity. The second cavity can be formed by the window 1890 and exit window 1885. Inert gas or some other suitable material can fill the lens cavity and/or the array cavity.

The range finder 1800 can also include AR coating 1840 to coat the lens 1820, band-pass coating 1850 to coat an undersurface of the window 1890, solder balls 1870 on an undersurface of the substrate 1895, and hermetic seals 1855, 1856 to seal the cavities. The range finder 1800 can form vias 1861 through the substrate 1895, window 1890, and exit window 1885 to allow electrical connections to the ASIC 1830 and two MEMS devices 1815, 1816.

The ASIC 1830 can drive the array 1810 and the two MEMS devices 1815, 1816. The ASIC 1830 can have the same or similar configuration as the ASIC 930 in FIG. 9. The ASIC 1830 can operate in a similar manner as well, except the ASIC 1830 can drive the two MEMS device 1815, 1816 to move the lens 1820 and the array 1810, rather than the prism 735 of FIG. 7.

The range finder 1800 can operate as follows. The ASIC 1830 can drive one or more of the emitters in the array 1810 to emit light. As described previously in FIG. 1, multiple emission patterns can be used according to the system in which the range finder 1500 is to be used. The ASIC 1830 can also drive the array 1810 and the lens 1820 to move along their respective x- or y-axes. The lens 1820 can receive and collimate the emitted light from the array 1810. The amount that the lens 1820 refracts the emitted light as it passes through the lens can depend on the position of the lens and the array 1810. Accordingly, if the lens 1820, the array 1810, or both move, the lens 1820 can output the collimated light toward a target object at a different angle. The target object can reflect the light back to the lens 1820. The lens 1820 can capture and focus the reflected light and can transmit the focused light to one or more photodetectors in the array 1810. The photodetectors driven by the ASIC 1830 can detect the focused light and transmit a detection signal to the ASIC 1830 or other components for processing.

The light paths in the range finder 1800 can be adjusted because of lens and/or array movement in the same or similar manner as depicted in FIGS. 12A and 12B (array movement) and FIGS. 16A and 16B (lens movement). The net effect is that, because of the movable lens 1820 and/or movable array 1810, the emitted light can be adjusted to contact a target object at adjusted positions. This can advantageously allow the range finder flexibility in directing light toward the object to get the optimal detection.

An exemplary fabrication process for the imaging range finder 1800 can be a hybrid of the fabrication in FIGS. 14A through 14E of a movable array and the fabrication in FIGS. 17A through 17F of a movable lens. For example, the fabrication process for the range finder 1800 of FIG. 18 can start by cutting a transparent wafer to form exit window 1885 and a bonding wafer to attach to the exit window. Portions of the bonding wafer can then be etched away to expose the undersurface of the exit window 1885, forming a hollow for housing lens 1820.

Imaging lens 1820 can be formed using any of the methods previously described in FIG. 6B. AR coating 1840 can be deposited onto the formed lens 1820 to coat the lens. A transparent wafer can be cut to form window 1890. Second MEMS device 1816 can be provided and bonded to the window 1890. The undersurface of the window 1890 can be sputter coated with band-pass coating 1850. Bonding material can be deposited on the undersurface of the window 1890, forming a hollow for housing array 1810 and ASIC 1830.

The first MEMS device 1815 can be provided and bonded to the substrate 1895. The solder balls 1870 can be sputtered onto the undersurface of the substrate 1895. The vias 1860 can be formed in the substrate 1895. The bonding material 1880 can be deposited onto the first MEMS device 1815. The array 1810 and the ASIC 1830 can be provided and bonded together. Vias 1862 can be formed in the ASIC 1830. The bonded array 1810 and ASIC 1830 can be bonded to the first MEMS device 1815 by the bonding material 1880.

The fabricated exit window portion and the fabricated second MEMS device portion can be put together to form a cavity. The lens 1820 can be positioned on the second MEMS device 1816 within the cavity. The cavity can be sealed with the hermetic seal 1856. This structure can be put together with the fabricated array portion to form a second cavity therebetween. The second cavity can be sealed with the hermetic seal 1855. Inert gas or some other suitable material can fill either or both the cavities. The via 1861 in the substrate 1895 can be extended through the window 1890 and the bonding material to allow electrical connection to the ASIC 1830 and the two MEMS devices 1815, 1816. The resulting structure, with the array 1810 and lens 1820 aligned, can form the imaging range finder 1800 of FIG. 18.

The imaging range finder 1800 of FIG. 18 can operate in any of the operating modes of FIGS. 5A through 5F.

Imaging Range Finder with Dual Movable Lenses

Figure 19:
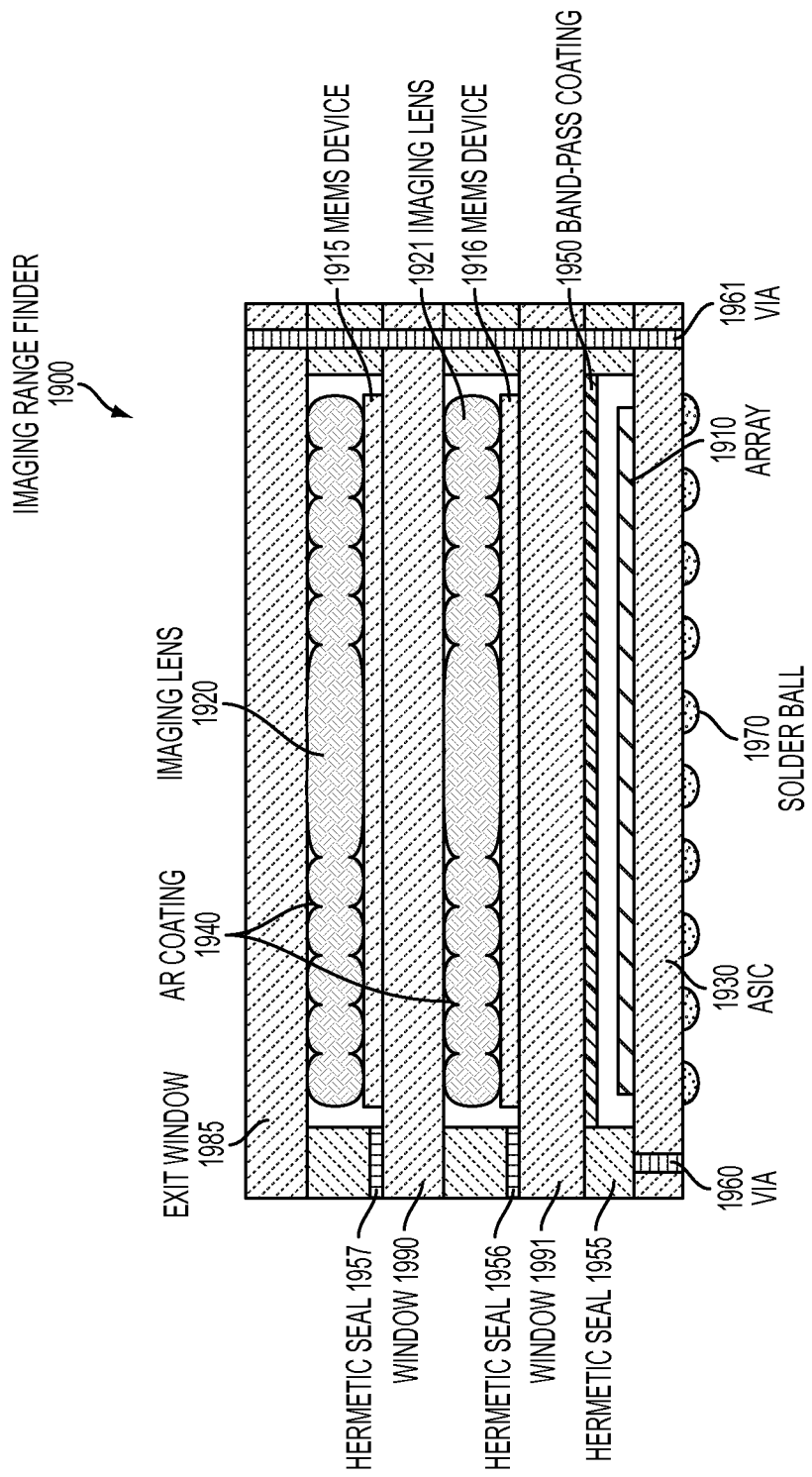
FIG. 19 illustrates an imaging range finder having multiple movable imaging lenses according to various examples of the disclosure.

FIG. 19 illustrates an imaging range finder having dual movable imaging lenses according to various examples. One lens can move along its x-axis and the other can move along its y-axis, thereby adjusting the collimated light path to different angles according to the shifted lenses' positions. This can advantageously allow the range finder to direct light at the target object so as to get the optimal detection of that object. In the example of FIG. 19, imaging range finder 1900 can include combined emitter-photodetector array 1910, similar to the array 110 of FIG. 1. The range finder 1900 can also include imaging lenses 1920, 1921, which can be the same or similar to the lens 1520 of FIG. 15. The lenses 1920, 1921 can be coated with AR coating 1940.

The range finder 1900 can further include first MEMS device 1915 to connect to the first lens 1920 to move the lens within a cavity. The cavity can be formed by window 1990 and exit window 1985. The range finder 1900 can include second MEMS device 1915 to connect to the second lens 1921 to move the lens within a second cavity. The second cavity can be formed by the window 1990 and window 1991.

ASIC 1930 can support the array 1910 within a third cavity formed by the ASIC and the window 1991. Inert gas 1945 or some other suitable material can fill any or all of the three cavities. ASIC 1930 can drive the array 1910 and the two MEMS devices 1915, 1916.

The ASIC 1930 can have the same or similar configuration as the ASIC 930 in FIG. 9. The ASIC 1930 can operate in a similar manner as well, except the ASIC 1930 can drive the two MEMS devices 1915, 1916 to move the lenses 1920, 1921, rather than the prism 735 of FIG. 7.

The range finder 1900 can operate as follows. The ASIC 1930 can drive one or more of the emitters in the array 1910 to emit light. As described previously in FIG. 1, multiple emission patterns can be used according to the system in which the range finder 1900 is to be used. The ASIC 1930 can also drive the lens 1920 to move along its x-axis and/or the lens 1921 to move along its y-axis or vice versa. The lenses 1920, 1921 can receive and collimate the emitted light from the array 1910. The amount that the lenses 1920, 1921 refract the emitted light as it passes through the lenses can depend on the position of the lenses. Accordingly, if either or both lenses 1920, 1921 move, they can output the collimated light toward a target object at a different angle. The target object can reflect the light back to the lenses 1920, 1921. The lenses 1920, 1921 can capture and focus the reflected light and can transmit the focused light to one or more photodetectors in the array 1910. The photodetectors driven by the ASIC 1930 can detect the focused light and transmit a detection signal to the ASIC 1930 or other components for processing.

The light paths in the range finder 1900 can be adjusted because of lens movement in the same or similar manner as depicted in FIGS. 16A and 16B. The net effect is that, because of the movable lenses 1920, 1921, the emitted light can be adjusted to contact a target object at adjusted positions, which can advantageously allow the range finder flexibility in directing light toward the object to get the optimal detection.

An exemplary fabrication process for the imaging range finder 1900 of FIG. 19 can be similar to the fabrication in FIGS. 17A through 17F of a movable lens. For example, the fabrication process can start with cutting a transparent wafer to form exit window 1985 and a bonding wafer to attach to the exit window. Portions of the wafer can be etched away to expose the undersurface of the exit window 1985, forming a hollow for housing the first lens 1920.

Imaging lenses 1920, 1921 can be formed using any of the methods previously described in FIG. 6B. AR coatings 1940 can be deposited onto the formed lenses 1920, 1921 to coat the lenses. A transparent wafer can be cut to form windows 1990, 1991. The first MEMS device 1915 can be provided and bonded to the window 1990. Bonding material can be deposited on the undersurface of the window 1990, forming a hollow for housing the second lens 1921. The second MEMS device 1916 can be provided and bonded to the window 1991. The undersurface of the window 1991 can be sputter coated with the band-pass coating 1950. Bonding material can be deposited on the undersurface of the window 1991, forming a hollow for housing the array 1910.

The ASIC 1930 can be provided and vias 1960 formed in the ASIC. Solder balls 1970 can be sputtered onto the undersurface of the ASIC 1930. The array 1910 can be provided and bonded to the ASIC 1930.

The fabricated exit window portion and the fabricated first MEMS portion can be put together to form a cavity. The first lens 1920 can be positioned on the first MEMS device 1915 within the cavity. The cavity can be sealed with the hermetic seal 1957. This structure can be put together with the fabricated second window portion to form a second cavity. The second lens 1921 can be positioned on the second MEMS device 1915 within the second cavity. The second cavity can be sealed with the hermetic seal 1956. This structure can be put together with the fabricated array portion to form a third cavity. The third cavity can be sealed with the hermetic seal 1955. Inert gas or some other suitable material can fill any or all of the three cavities. The via 1961 in the ASIC 1930 can be extended through the windows 1990, 1991 and bonding material to allow electrical connection to the MEMS devices 1915, 1916. The resulting structure, with the array 1910 and lenses 1920, 1921 aligned, can form the imaging range finder 1900 of FIG. 19.

The imaging range finder 1900 of FIG. 19 can operate in any of the operating modes of FIGS. 5A through 5F.

Imaging Range Finder with Multiple Imaging Lens

As described previously, because a surface of a target object is not generally perfectly smooth, light reflected off the object can scatter along several paths, in addition to the reverse path of the light from the range finder. It can be beneficial to capture some of the scattered light to increase the amount of reflected light detected, thereby improving the detection of the target object.

Figure 20:
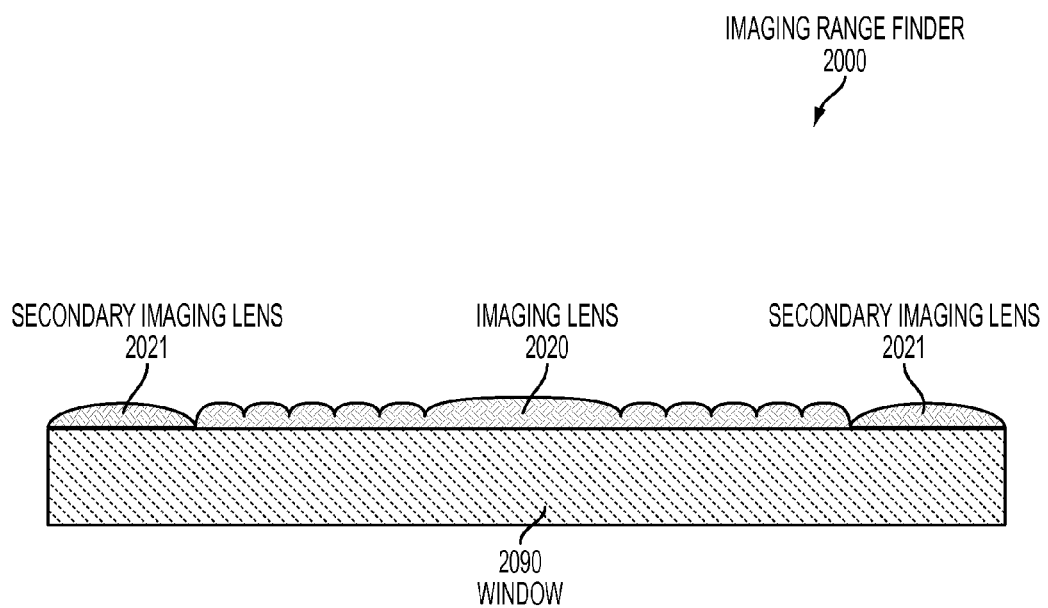
FIG. 20 illustrates a lens portion of an imaging range finder having multiple imaging lenses according to various examples of the disclosure.

FIG. 20 illustrates a lens portion of an imaging range finder having multiple imaging lenses to capture scattered light according to various examples. In the example of FIG. 20, imaging range finder 2000 can include imaging lens 2020, which is similar to the lens 120 of FIG. 1, and window 2090 for holding the lens. The range finder 2000 can also include secondary imaging lenses 2021 adjacent to the lens 2020. The secondary lenses 2021 can have different focal lengths than the lens 2020. The secondary lenses 2021 can capture the scattered light from the object that could otherwise be lost. The secondary lenses 2021 can also compensate for aberrations resulting from the lens 2020 that result in light loss at the edge of the emitter-photodetector array (not shown). This multiple lens combination can replace the lens portions in FIGS. 1, 7, and 11, for example. The array portion (not shown) of the image finder 2000 can be the same or similar to any one of the array portions shown in FIGS. 1, 7, 11, 15, 18, and 19, where a combined emitter-photodetector array (not shown) can emit light via the lens 2020 onto objects and detect light via the lens reflected back from the object and where an ASIC (not shown) can drive the array.

The range finder 2000 can operate as follows. The ASIC can drive one or more of the emitters in the array to emit light. As described previously in FIG. 1, multiple emission patterns can be used according to the system in which the range finder 2000 is to be used. The lens 2020 can collimate and output the emitted light toward a target object. The target object can reflect the light back to the lens 2020, with scattered light reflected to the secondary lenses 2021. The lenses 2020, 2021 can capture and focus the reflected light and can transmit the focused light to one or more photodetectors in the combined emitter-photodetector array. The photodetectors in the combined emitter-photodetector array driven by the ASIC can detect the focused light and transmit a detection signal to the ASIC or other components for processing.

Figure 21:
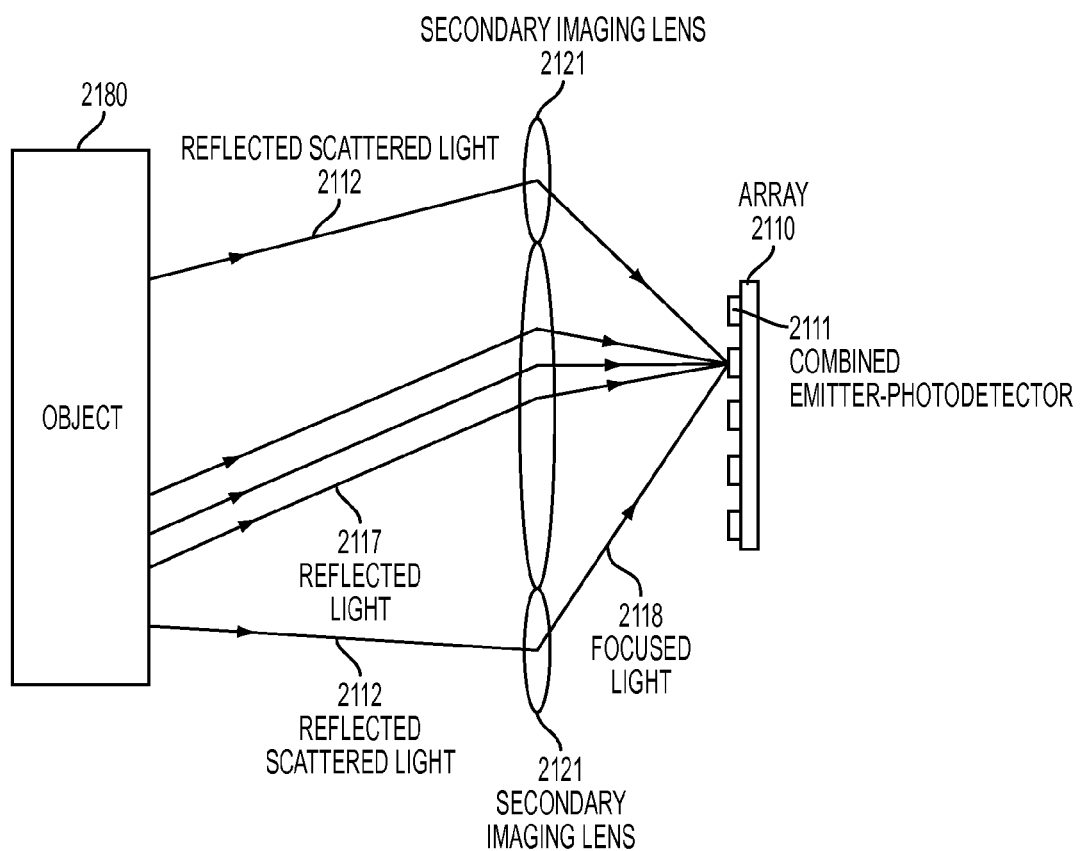
FIG. 21 depicts light paths for the imaging range finder of FIG. 20 according to various examples of the disclosure.

FIG. 21 depicts exemplary light paths for the range finder 2000. In the example of FIG. 21, the reflected light path from object 2180 back to combined emitter-photodetector array 2110 through the lenses 2120, 2121 is depicted. Here, the object 2180 can reflect light 2117, in which most of the light can be reflected back to the lens 2120 along the reverse path that the light traveled to the object and can be focused 2118 onto the photodetectors of the array 2110. However, some of the reflected, scattered light 2112 can scatter away from the reverse path onto the secondary lenses 2121. The secondary lenses 2121 can then focus the light 2118 onto the photodetectors of the array 2110. Scattered light that would otherwise have been lost can be captured, thereby increasing the amount of reflected light detected and, hence, improving the detection of the target object.

During fabrication of the imaging range finder 2000, the lenses 2020, 2021 and the window 2090 can be fabricated in the same or similar manner as described in FIGS. 6A and 6B, for example. The resulting structure can be bonded to the array portion as described FIG. 6C, for example.

The imaging range finder 2000 of FIG. 20 can operate in any of the operating modes of FIGS. 5A through 5F.

Imaging Range Finder Systems

Figure 22:
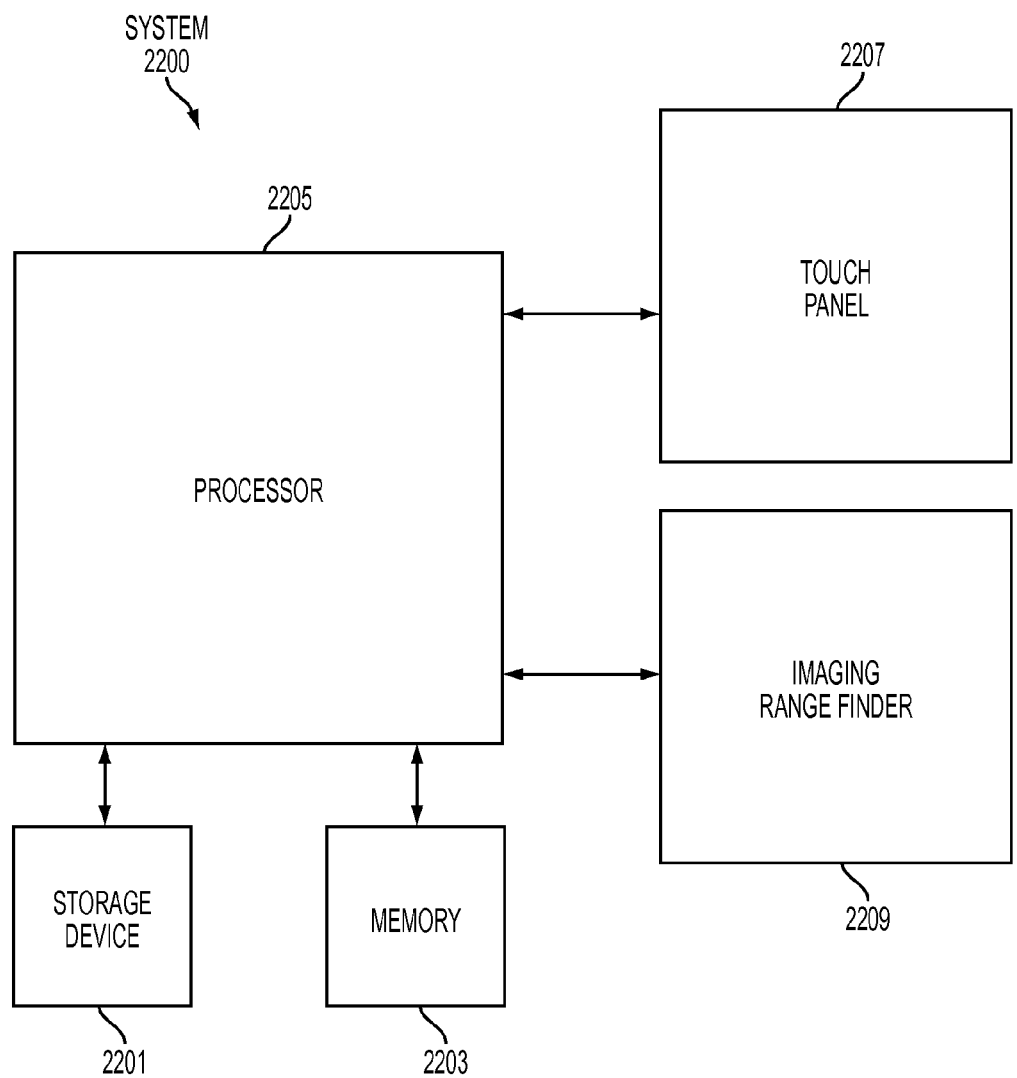
FIG. 22 illustrates a computing system having an imaging range finder according to various examples of the disclosure.

One or more of the imaging range finders can operate in a system similar or identical to system 2200 shown in FIG. 22. System 2200 can include instructions stored in a non-transitory computer readable storage medium, such as memory 2203 or storage device 2201, and executed by processor 2205. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

The system 2200 can further include imaging range finder 2209 coupled to the processor 2205. The imaging range finder 2209 can be any of those described in FIGS. 1 through 21. The system 2200 can include touch panel 2207 coupled to the processor 2205. Touch panel 2207 can have touch nodes capable of detecting an object touching or hovering over the panel. The processor 2205 can process the outputs from the touch panel 2207 to perform actions based on the touch or hover event.

It is to be understood that the system is not limited to the components and configuration of FIG. 22, but can include other or additional components in multiple configurations according to various examples. Additionally, the components of system 2200 can be included within a single device, or can be distributed between multiple devices. In some examples, the processor 2205 can be located within the touch panel 2207 and/or the imaging range finder 2209.

Figure 23:
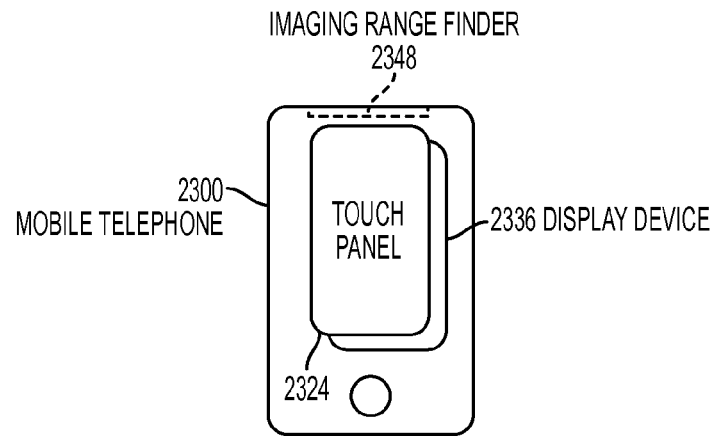
FIG. 23 illustrates a mobile telephone that can include an imaging range finder according to various examples of the disclosure.

FIG. 23 illustrates an exemplary mobile telephone 2300 that can include touch panel 2324, display 2336, imaging range finder 2348, and other computing system blocks according to various examples.

Figure 24:
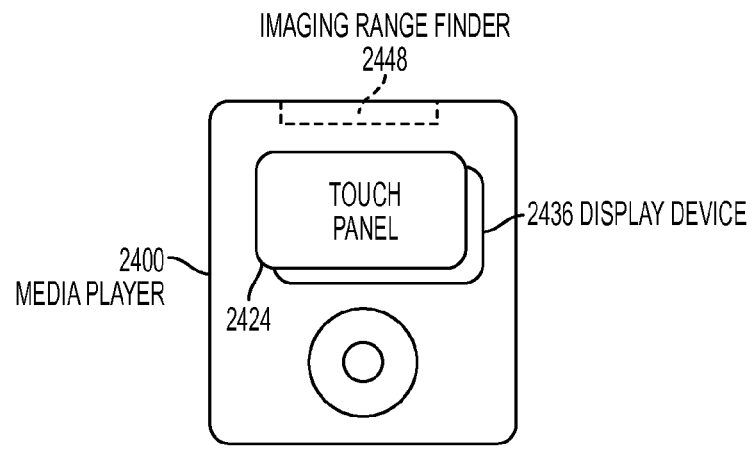
FIG. 24 illustrates a digital media player that can include an imaging range finder according to various examples of the disclosure.

FIG. 24 illustrates an exemplary digital media player 2400 that can include touch panel 2424, display 2436, imaging range finder 2448, and other computing system blocks according to various examples.

Figure 25:
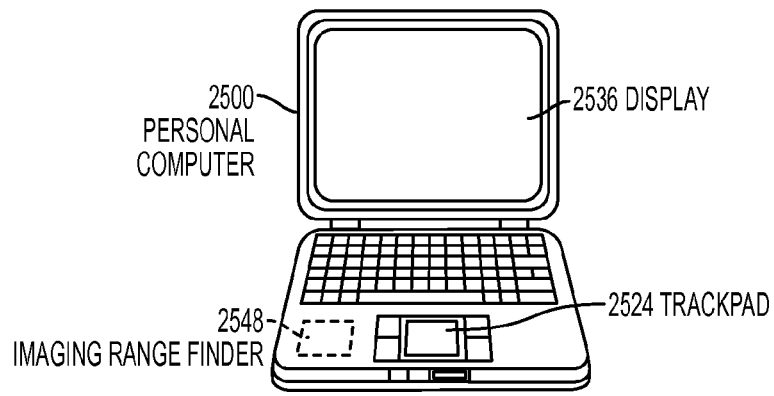
FIG. 25 illustrates a portable computer that can include an imaging range finder according to various examples of the disclosure.

FIG. 25 illustrates an exemplary personal computer 2500 that can include touch panel (trackpad) 2524, display 2536, imaging range finder 2548, and other computing system blocks according to various examples.

The mobile telephone, media player, and personal computer of FIGS. 23 through 25 can increase capabilities and improve performance with an imaging range finder according to various examples.

Imaging Range Finder Applications

An imaging range finder according to various examples can be used in several applications, for example: to scan a room to get accurate room measurements for interior design of the room; to map a space for inventory control, space planning, space navigation, and photo sharing; for 3D object scanning and pattern matching; as a navigation aid for the visually-impaired to detect landmarks, stairs, low tolerances, and the like; as a communication aid for the deaf to recognize and interpret sign language for a hearing user; for automatic foreground/background segmentation; for real-time motion capture and avatar generation; for photo editing; for night vision; to see through opaque or cloudy environment, such as fog, smoke, haze; for computational imaging, such as to change focus and illumination after acquiring images and video; for autofocus and flash metering; for same-space detection of another device; for two-way communication; for secure file transfers; to locate people or objects in a room; to capture remote sounds; and so on.

Therefore, according to the above, some examples of the disclosure are directed to an imaging range finder comprising: an array of emitters capable of emitting light and photodetectors capable of detecting light; and an imaging lens capable of collimating the emitted light from the emitters and focusing light received from an object onto the corresponding photodetectors. Additionally or alternatively to one or more of the examples disclosed above, the array and the lens of the range finder can be fixed relative to each other so as to provide a path for the emitted light through the lens and a path for the focused light onto the photodetectors. Additionally or alternatively to one or more of the examples disclosed above, the range finder can comprise a movable prism positioned between the array and the lens and capable of adjusting a path of the emitted light from the emitters and the focused light from the lens based on movement of the prism; and an electromechanical device capable of moving the prism. Additionally or alternatively to one or more of the examples disclosed above, the range finder can comprise an electromechanical device capable of moving the array, wherein the array is movable relative to the lens so as to adjust a path of the emitted light from the emitters based on movement of the array. Additionally or alternatively to one or more of the examples disclosed above, the range finder can comprise an electromechanical device capable of moving the lens, wherein the lens is movable relative to the array so as to adjust a path of the collimated light outputted to the object and the light received from the object based on movement of the lens. Additionally or alternatively to one or more of the examples disclosed above, the range finder can comprise at least one electromechanical device capable of moving the lens and the array, wherein the lens and the array are movable relative to each other so as to adjust paths of the emitted light and the focused light between the array and the lens and paths of the collimated light and the light received from the object between the lens and the object based on movement of the lens and the array. Additionally or alternatively to one or more of the examples disclosed above, the range finder can comprise a second imaging lens adjacent to the imaging lens; and at least one electromechanical device capable of moving the imaging lens and the second imaging lens, wherein the two imaging lenses are movable relative to the array, the imaging lens movable in a first direction and the second imaging lens movable in a second direction so as to adjust a path of the collimated light outputted to the object and the light received from the object based on movement of the two imaging lenses. Additionally or alternatively to one or more of the examples disclosed above, the range finder can comprise at least one second imaging lens capable of focusing light scattered by the object, wherein the second imaging lens is proximate to the imaging lens. Additionally or alternatively to one or more of the examples disclosed above, the range finder can comprise a driver circuit capable of driving the array, wherein the circuit selects which emitters to emit light and which photodetectors to detect light. Additionally or alternatively to one or more of the examples disclosed above, the range finder can comprise an electromechanical device capable of moving at least one of the lens or the array; and a driver circuit capable of driving the electromechanical device, wherein the circuit drives the electromechanical device to move the lens or the array. Additionally or alternatively to one or more of the examples disclosed above, the array of the range finder can include at least one emitter and one photodetector combined as a single node. With respect to one or more of the examples disclosed above, the range finder can be incorporated into at least one of a mobile phone, a digital media player, or a personal computer.

Some examples of the disclosure are directed to a method of finding a range of an object, comprising: emitting light from an emitter in an array; collimating the emitting light with an imaging lens in optical communication with the array; outputting from the lens the collimated light to an object; receiving at the lens light from the object; and focusing the received light onto a photodetector in the array. Additionally or alternatively to one or more of the examples disclosed above, the method can comprise finding a proximate range of the object based on a time lapse between the emitted light leaving the emitter and the focused light arriving at the photodetector, wherein the focused light includes at least a portion of the outputted light reflected off the object, and wherein the shorter the time lapse, the closer the object. Additionally or alternatively to one or more of the examples disclosed above, the method can comprise finding a proximate range of the object based on an intensity of the focused light, wherein the higher the intensity, the closer the object. Additionally or alternatively to one or more of the examples disclosed above, the method can comprise capturing an image of the focused light, representative of the object; and determining a proximate range of the object based on the object representation, wherein the larger the relative size of the representation, the closer the object. Additionally or alternatively to one or more of the examples disclosed above, the method can comprise generating a wave tone; modulating the emitted light from the emitter with the wave tone; receiving the focused light at the photodetector modulated with a sound wave from the object; and demodulating the focused light to capture the sound wave. Additionally or alternatively to one or more of the examples disclosed above, the method can comprise encoding data; and transmitting the emitted light having the encoded data therein for decoding at the object. Additionally or alternatively to one or more of the examples disclosed above, the method can comprise receiving the focused light at the photodetector having encoded data from the object therein; and decoding the encoded data. Additionally or alternatively to one or more of the examples disclosed above, the method can comprise receiving at the lens light generated by the object as an acknowledgement that the object detected the outputted light, the acknowledgement indicating presence of the object in a predefined space with the range finder. Additionally or alternatively to one or more of the examples disclosed above, the method can comprise receiving at the lens light generated by the object; and emitting light from the emitter as an acknowledgement of the light generated by the object, the acknowledgement indicating presence of the range finder in a predefined space with the object. Additionally or alternatively to one or more of the examples disclosed above, the method can comprise moving at least one of the array or the lens, wherein moving the array or the lens adjusts a location on the object at which the collimated light strikes and selects which photodetector is to detect the received light from the object. Additionally or alternatively to one or more of the examples disclosed above, the method can comprise receiving at a second imaging lens light scattered by the object; and focusing the received scattered light onto a photodetector in the array.

Some examples of the disclosure are directed to an imaging range finder system comprising: an imaging range finder including an array of nodes, each node having at least a emitter or a photodetector, and an imaging lens capable of transmitting light from an emitter in one of the nodes toward an object, and receiving light from the object to a photodetector in one of the nodes for detection; and a processor capable of processing a detection signal from the photodetector in the one node, the signal based on the received light from the object. Additionally or alternatively to one or more of the examples disclosed above, the detection signal indicates at least one of a range of the object from the range finder, a sound emanating from the object, acknowledgement of data sent to the object, data received from the object, or confirmation of a presence of the object in a predefined space.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. An imaging range finder comprising:
   an array comprised of emitters capable of emitting light and photodetectors capable of detecting light;
   an imaging lens capable of collimating the emitted light from the emitters and focusing light received from an object onto corresponding photodetectors;
   a moveable prism positioned between the array and the imaging lens, the moveable prism configured to adjust a path of the focused light from the imaging lens based on movement of the moveable prism, wherein the moveable prism is capable of moving along a plurality of axes; and
   an electromechanical device capable of moving the moveable prism.

2. The range finder of claim 1, further comprising:
   an electromechanical device capable of moving the array, wherein the array is movable relative to the imaging lens so as to adjust a path of the emitted light from the emitters based on movement of the array.

3. The range finder of claim 1, further comprising:
   an electromechanical device capable of moving the imaging lens,
   wherein the imaging lens is movable relative to the array so as to adjust a path of the collimated light outputted to the object and the light received from the object based on movement of the imaging lens.

4. The range finder of claim 1, further comprising:
at least one electromechanical device capable of moving the imaging lens and the array,
wherein the imaging lens and the array are movable relative to each other so as to adjust paths of the emitted light and the focused light between the array and the imaging lens and paths of the collimated light and the light received from the object between the imaging lens and the object based on movement of the imaging lens and the array.

5. The range finder of claim 1, further comprising:
a second imaging lens adjacent to the imaging lens; and
at least one electromechanical device capable of moving the imaging lens and the second imaging lens,
wherein the two imaging lenses are movable relative to the array, the imaging lens movable in a first direction and the second imaging lens movable in a second direction so as to adjust a path of the collimated light outputted to the object and the light received from the object based on movement of the two imaging lenses.

6. The range finder of claim 1, further comprising:
at least one second imaging lens capable of focusing light scattered by the object,
wherein the second imaging lens is proximate to the imaging lens.

7. The range finder of claim 1, further comprising:
a driver circuit capable of driving the array,
wherein the driver circuit selects which emitters to emit light and which photodetectors to detect light.

8. The range finder of claim 1, further comprising:
an electromechanical device capable of moving at least one of the imaging lens or the array;
and a driver circuit capable of driving the electromechanical device,
wherein the driver circuit drives the electromechanical device to move the imaging lens or the array.

9. The range finder of claim 1, wherein the array includes at least one emitter and one photodetector combined as a single node.

10. The range finder of claim 1 incorporated into at least one of a mobile phone, a digital media player, or a personal computer.

11. A method of finding a range of an object, comprising:
emitting light from an emitter in an array;
moving a movable prism positioned between the array and an imaging lens in a plurality of axes to adjust a path of the emitted light with an electromechanical device;
collimating the emitted light with the imaging lens in optical communication with the array;
outputting from the imaging lens the collimated light to the object;
receiving at the imaging lens light from the object; and
focusing the received light onto a photodetector in the array.

12. The method of claim 11, further comprising:
finding a proximate range of the object based on a time lapse between the emitted light leaving the emitter and the focused light arriving at the photodetector,
wherein the focused light includes at least a portion of the outputted light reflected off the object, and
wherein the shorter the time lapse, the closer the object.

13. The method of claim 11, further comprising:
finding a proximate range of the object based on an intensity of the focused light,
wherein the higher the intensity, the closer the object.

14. The method of claim 11, further comprising:
capturing an image of the focused light, representative of the object; and
determining a proximate range of the object based on the object representation,
wherein the larger the relative size of the representation, the closer the object.

15. The method of claim 11, further comprising:
generating a wave tone;
modulating the emitted light from the emitter with the wave tone;
receiving the focused light at the photodetector modulated with a sound wave from the object; and
demodulating the focused light to capture the sound wave.

16. The method of claim 11, further comprising:
encoding data; and
transmitting the emitted light having the encoded data therein for decoding at the object.

17. The method of claim 11, further comprising:
receiving the focused light at the photodetector having encoded data from the object therein; and
decoding the encoded data.

18. The method of claim 11, further comprising:
receiving at the imaging lens light generated by the object as an acknowledgement that the object detected the outputted light, the acknowledgement indicating presence of the object in a predefined space with the range finder.

19. The method of claim 11, further comprising:
receiving at the imaging lens light generated by the object; and
emitting light from the emitter as an acknowledgement of the light generated by the object,
the acknowledgement indicating presence of the range finder in a predefined space with the object.

20. The method of claim 11, further comprising:
moving at least one of the array or the imaging lens,
wherein moving the array or the lens adjusts a location on the object at which the collimated light strikes and selects which photodetector is to detect the received light from the object.

21. The method of claim 11, further comprising:
receiving at a second imaging lens light scattered by the object; and
focusing the received scattered light onto a photodetector in the array.

22. An imaging range finder system comprising:
an imaging range finder including
an array of nodes, each node having at least one of an emitter or a photodetector, and
an imaging lens capable of transmitting light from an emitter in one of the nodes toward an object, and receiving light from the object to a photodetector in one of the nodes for detection; and
a processor capable of processing a detection signal from the photodetector in the one node, the detection signal based on the received light from the object;
a moveable prism positioned between the array and the imaging lens, the moveable prism configured to adjust a path of the light from an emitter in one of the nodes based on movement of the moveable prism, wherein the moveable prism is capable of moving along a plurality of axes; and
an electromechanical device capable of moving the moveable prism.

23. The system of claim 22, wherein the detection signal indicates at least one of a range of the object from the range finder, a sound emanating from the object, acknowledgement of data sent to the object, data received from the object, or confirmation of a presence of the object in a predefined space.

24. The range finder of claim 1, wherein the array and the lens are fixed relative to each other as to provide a path for the emitted light through the lens and a path for the focused light onto the photodetectors.

* * * * *